United States Patent
Yokouchi

(10) Patent No.: US 11,044,384 B2
(45) Date of Patent: Jun. 22, 2021

(54) COLOR PREDICTION METHOD

(71) Applicant: SCREEN HOLDINGS CO., LTD., Kyoto (JP)

(72) Inventor: Kenichi Yokouchi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/796,626

(22) Filed: Feb. 20, 2020

(65) Prior Publication Data
US 2020/0314290 A1 Oct. 1, 2020

(30) Foreign Application Priority Data
Mar. 26, 2019 (JP) .............................. JP2019-058380

(51) Int. Cl.
*H04N 1/60* (2006.01)
*G06T 7/90* (2017.01)
*G06N 3/08* (2006.01)
*G06N 3/02* (2006.01)
*G06N 3/04* (2006.01)

(52) U.S. Cl.
CPC .............. *H04N 1/6038* (2013.01); *G06N 3/02* (2013.01); *G06N 3/08* (2013.01); *G06T 7/90* (2017.01); *H04N 1/6033* (2013.01); *G06N 3/0472* (2013.01); *H04N 1/6027* (2013.01)

(58) Field of Classification Search
CPC combination set(s) only.
See application file for complete search history.

(56) References Cited

U.S. PATENT DOCUMENTS

| 5,589,954 | A | 12/1996 | Watanabe | |
| 7,869,089 | B2 * | 1/2011 | Horita | G01J 3/463 |
| | | | | 358/1.9 |
| 8,199,367 | B2 * | 6/2012 | Hoshii | H04N 1/40 |
| | | | | 358/3.24 |
| 10,382,645 | B2 * | 8/2019 | Bai | H04N 1/32309 |
| 10,652,422 | B2 * | 5/2020 | Bai | G06T 1/005 |

(Continued)

FOREIGN PATENT DOCUMENTS

| JP | 06-217143 A | 8/1994 |
| JP | 2016-082598 A | 5/2016 |

OTHER PUBLICATIONS

K. Deshpande et al., "Recommendations for predicting spot color overprints", (http://www.color.org/ICC_white_paper_43_Draft2kd.doc), retrieved Jun. 7, 2018.

*Primary Examiner* — Barbara D Reinier
(74) *Attorney, Agent, or Firm* — McDermott Will & Emery LLP

(57) ABSTRACT

First, a color close to a prediction target color is selected as a similar color from among a plurality of sample colors for which spectral reflectances of a plurality of patches are obtained. Next, for a similar color, a relational equation representing the relationship between the spectral reflectances of a solid patch (a patch with the highest ink density) and the spectral reflectances of a color prediction target patch is obtained. Finally, the spectral reflectances of the solid patch for the prediction target color are applied to the relational equation, by which predicted values of spectral reflectances of the color prediction target patch for the prediction target color are obtained.

18 Claims, 21 Drawing Sheets

(56) References Cited

U.S. PATENT DOCUMENTS

| | | |
|---|---|---|
| 2008/0111997 A1 | 5/2008 | Edge |
| 2008/0282915 A1 | 11/2008 | Horita |
| 2009/0021807 A1 | 1/2009 | Horita |
| 2016/0112604 A1 | 4/2016 | Bestmann |
| 2016/0360072 A1 | 12/2016 | Inamura et al. |

* cited by examiner

```
COLOR PREDICTION PROCESS
        ↓
S110  SELECT SIMILAR COLOR
        ↓
S120  CALCULATE RELATIONAL EQUATION
        ↓
S130  PREDICT SPECTRAL REFLECTANCES
        ↓
       END
```

| WAVELENGTH | PREDICTION TARGET COLOR | SAMPLE COLOR (C1) | SAMPLE COLOR (C2) | ...... |
|---|---|---|---|---|
| 380 | Re(1) | Rs(1)(1) | Rs(2)(1) | ...... |
| 390 | Re(2) | Rs(1)(2) | Rs(2)(2) | ...... |
| 400 | Re(3) | Rs(1)(3) | Rs(2)(3) | ...... |
| ⋮ | ⋮ | ⋮ | ⋮ | ⋮ |
| 710 | Re(34) | Rs(1)(34) | Rs(2)(34) | ...... |
| 720 | Re(35) | Rs(1)(35) | Rs(2)(35) | ...... |
| 730 | Re(36) | Rs(1)(36) | Rs(2)(36) | ...... |

COLOR PREDICTION METHOD

BACKGROUND OF THE INVENTION

Field of the Invention

The present invention relates to a color prediction method and a color prediction program for predicting a color of a patch in a color chart used for predicting a color obtained by overprinting inks of a plurality of colors (typically, a plurality of colors including a spot color).

Description of Related Art

In recent years, digital printing apparatuses have become popular in the printing industry. However, in the labeling and packaging field, printing (offset printing, gravure printing, flexographic printing, etc.) with printing apparatuses using printing plates (hereinafter referred to as a "conventional printing apparatus" or simply referred to as a "printing apparatus") is still often performed in recent years. Meanwhile, there is an increasing demand for quick delivery for design and content production, and when there are some changes in design or the like in a case in which a conventional printing apparatus is used, cost for recreation of the printing plate or retrogression of the process is high, which is a significant problem. In this respect, a digital printing apparatus does not use a printing plate, and thus, does not need an operation for exchanging or recreating the printing plate. That is, by adopting a digital printing apparatus, it is possible to carry out especially small-lot printing at low cost, and therefore, it is also possible to respond to the demand of quick delivery for design and content production at low cost.

Meanwhile, in the labeling and packaging field, spot colors tend to be often used for enhancing color expression. For this reason, in order to perform printing with a digital printing apparatus using print data generated for printing with a conventional printing apparatus, it is necessary that colors obtained by overprinting spot color inks be predicted and the predicted colors be reproduced with the digital printing apparatus. In the following, prediction values of values (specifically, reflectance or tristimulus values X, Y, and Z in the CIE 1931 XYZ color space) identifying colors obtained by overprinting inks of a plurality of colors is referred to as an "overprint prediction value".

The "Recommendations for predicting spot color overprints" (http://www.color.org/ICC_white_paper_43_Draft2kd.doc) by K. Deshpande and P. Green discloses a method (hereinafter, referred to as "Deshpande et al. method") for relatively easily predicting colors (overprint prediction values) obtained by overprinting inks of a plurality of colors including a spot color. In the Deshpande et al. method, overprint prediction values are expressed as in the following Equations (1) to (3) using tristimulus values X, Y, and Z (see FIG. 31).

$$X = j_x \times (X_b \times X_f) + k_x \quad (1)$$

$$Y = j_y \times (Y_b \times Y_f) + k_y \quad (2)$$

$$Z = j_z \times (Z_b \times Z_f) + k_z \quad (3)$$

Here, $X_b$, $Y_b$, and $Z_b$ are tristimulus values of a background color, $X_f$, $Y_f$, and $Z_f$ are tristimulus values of a foreground color, $j_x$, $j_y$, and $j_z$ are scaling coefficients, and $k_x$, $k_y$, and $k_z$ are constants. Hereinafter, $j_x$, $j_y$, $j_z$, $k_x$, $k_y$, and $k_z$ are collectively referred to as "overprint coefficient".

Meanwhile, color reproduction methods include additive color mixing and subtractive color mixing. In the case of printing, the subtractive color mixing is applied for color reproduction. In this regard, if ideal subtractive color mixing is performed, the stimulus value X of the color obtained by overprinting is represented by "$X_b \times X_f$" (the same applies to the stimulus values Y and Z), for example. However, in order to obtain a more accurate value, it is necessary to make a correction in consideration of an error caused by the use of an opaque ink and reflection of light on the surface. Therefore, in the Deshpande et al. method, a correction using a linear equation is performed as shown in the above Equations (1) to (3).

In the Deshpande et al. method, a color chart as schematically shown in FIG. 32 is used, for example. This color chart is called a "CxF chart". In the example shown in FIG. 32, the CxF chart is composed of twenty-two patches. The eleven patches in the upper part are patches obtained by printing an ink of a target spot color on a base material such as paper at a dot percentage in increments of 10%. The eleven patches in the lower part are patches obtained by printing an ink of a target spot color on black (black solid) at a dot percentage in increments of 10%. As above, the CxF chart includes a plurality of patches corresponding to ink densities of a plurality of levels. The overprint prediction value is calculated using the value (colorimetry value) obtained by the colorimetry of the patches in the CxF chart described above.

Hereinafter, the Deshpande et al. method will be described in detail with reference to the flowchart in FIG. 33, taking, as an example, calculation of an overprint prediction value in the case where a background color is a spot color at a dot percentage of 40% (referred to as a "spot color 1" for convenience) and a foreground color is another spot color at a dot percentage of 60% (referred to as a "spot color 2" for convenience).

First, the CxF chart is printed using the ink of spot color 1, and further, the CxF chart is printed using the ink of spot color 2 (step S900).

Next, the overprint coefficients $j_x$, $j_y$, $j_z$, $k_x$, $k_y$, and $k_z$ of the above Equations (1) to (3) regarding the spot color 2 are calculated using the CxF chart printed using the ink of spot color 2 (referred to as "spot color 2 chart" for convenience) (step S910). In this regard, focusing on the above Equation (1), for example, the practical maximum value and the minimum value for $X_b \times X_f$ are values obtained by the ink of the spot color 2 being applied on the base material and black (black solid), respectively. The same applies to $Y_b \times Y_f$ and $Z_b \times Z_f$. Therefore, in order to calculate the overprint coefficient, in a coordinate system representing the above Equations (1) to (3) (see FIG. 34. Note that FIG. 34 shows only the coordinate system representing the above Equation (1)), the coordinates representing the stimulus value of a state where the ink of the spot color 2 at a dot percentage of 60% is applied on black are defined as a first calibration point P91, and the coordinates representing the stimulus value of a state where the ink of the spot color 2 at a dot percentage of 60% is applied on the base material are defined as a second calibration point P92.

Focusing on, for example, X among the tristimulus values, values are assigned as follows for the first calibration point P91 with respect to the above Equation (1). The value obtained by colorimetry of the patch PA93 in the spot color 2 chart (black stimulus value) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$, and the value obtained by colorimetry of the patch PA91 in the spot color 2 chart (stimulus value of a state where the ink of the spot color 2 at a dot percentage of 60% is applied on black) is assigned to X (see FIG. 32). In addition, for the second calibration point P92, values are assigned as follows with respect to the above Equation (1). The value obtained by colorimetry of the patch PA94 in the spot color 2 chart (stimulus value of base material) is assigned to $X_b$, the value obtained by colorimetry of the patch PA92 in the spot color 2 chart (stimulus value of a state where the ink of the spot color 2 at a dot percentage of 60% is applied on the base material) is assigned to $X_f$ and X (see FIG. 32).

The overprint coefficients $j_x$ and $k_x$ are calculated by solving a simultaneous equation consisting of the equation relating to the first calibration point P91 and the equation relating to the second calibration point P92. That is, an equation representing a straight line denoted by reference numeral L91 in FIG. 34 is obtained. The overprint coefficients $j_y$, $j_z$, $k_y$, and $k_z$ are similarly calculated.

Although the patches are provided in 10% increments in the CxF chart shown in FIG. 32, an overprint coefficient corresponding to the dot percentage between two patches which are adjacent to each other in the horizontal direction can be obtained on the basis of the colorimetric values obtained by linear interpolation.

Next, the values of $X_b$, $Y_b$, and $Z_b$ (tristimulus values of the background color) for calculating final overprint prediction values in the above Equations (1) to (3) are obtained using the CxF chart printed using the ink of spot color 1 (referred to as "spot color 1 chart" for convenience) (step S920). Specifically, the values of $X_b$, $Y_b$, and $Z_b$ are obtained by colorimetry of the patch PA95 (see FIG. 32) in the spot color 1 chart.

Next, the values of $X_f$, $Y_f$, and $Z_f$ (tristimulus values of the foreground color) for calculating the final overprint prediction values in the above Equations (1) to (3) are obtained using the spot color 2 chart (step S930). Specifically, the values of $X_f$, $Y_f$, and $Z_f$ are obtained by colorimetry of the patch PA92 (see FIG. 32) in the spot color 2 chart.

Finally, the values obtained in steps S910 to S930 are substituted into the above Equations (1) to (3), whereby the tristimulus values X, Y, and Z as overprint prediction values are calculated (step S940). This corresponds to, for example, calculating, as the value of X, the ordinate value of the straight line L91 in FIG. 34 when the abscissa indicates the product of "$X_b$ calculated in step S920" and "$X_f$ calculated in step S930".

In the above processing, the values of X, $X_f$, and $X_b$ relating to the first calibration point P91 (see FIG. 34) are obtained by colorimetry of the patches PA91, PA92, and PA93 in the spot color 2 chart. However, if a highly accurate overprint prediction value is not necessary, the first calibration point P91 can be regarded as being located at the origin of the graph in FIG. 34 for simplicity. In this case, the colorimetry of the patches PA91 and PA93 in the spot color 2 chart is not necessary (the colorimetry of the patch PA92 is still necessary for obtaining the values of X and $X_f$ of the second calibration point P92). In this case, the tristimulus values X, Y, and Z as the overprint prediction values can be calculated without printing the lower patch group including the patches PA91 and PA93 in the CxF chart shown in FIG. 32. The CxF chart having the upper patch group shown in FIG. 32 without having the lower patch group is herein referred to as a "simple CxF chart" for convenience.

It should be noted that, in relation to a specific embodiment of the present invention to be described later, Japanese Laid-Open Patent Publication No. 6-217143 discloses a technique for selecting a gamma correction curve to be used to adjust image quality from among a plurality of curves.

As described above, according to the Deshpande et al. method, color prediction is performed using a CxF chart, for example, as shown in FIG. 32. However, even when printing using spot colors is performed, such a CxF chart is usually not printed in advance. For this reason, it is necessary to print the same number of CxF charts as the same number of the spot colors and perform colorimetry of the respective patches. This causes an increase in cost and man-hours.

In view of this, it is considered that a color of a halftone patch is predicted on the basis of the colorimetric value of a patch obtained by solidly applying a target spot color ink all over the base material (at a dot percentage of 100%) (hereinafter referred to as a "solid patch"). Specifically, it is conceivable that the spectral reflectances of the halftone patch are predicted on the basis of the spectral reflectances of the solid patch. In this regard, Japanese Laid-Open Patent Publication No. 2016-82598 discloses the Yule-Nielsen model as one of the methods for predicting halftone. In this model, the reflectance $R(\lambda)$ is obtained by the following Equation (4).

$$R(\lambda) = [a \times R_{\lambda 100\%}^{1/n} + (1-a) \times R_{\lambda Paper}^{1/n}]^n \quad (4)$$

Here, a represents a dot percentage, $R_{\lambda 100\%}$ represents a reflectance in a state in which the target ink is solidly applied, $R_{\lambda paper}$ represents a reflectance of paper white (printing paper), and n is a coefficient that is obtained experimentally.

According to the Yule-Nielsen model, however, the prediction accuracy is insufficient. FIG. 35 and FIG. 36 are graphs showing spectral reflectances (values obtained by performing normalization so that the spectral reflectances of paper white (at a dot percentage of 0%) are 1) corresponding to each dot percentage in 10% increments within a range from 0% to 100% regarding a certain color. In FIG. 35 and FIG. 36, the horizontal axis represents wavelength (unit: nm), and the vertical axis represents reflectance. It should be noted that the graph shown in FIG. 35 represents spectral reflectances obtained using the Yule-Nielsen model, and the graph shown in FIG. 36 represents actual spectral reflectances. Focusing on the spectral reflectances on the dotted line denoted by reference numeral 95 in FIG. 35 and FIG. 36, the spectral reflectance monotonously decreases with respect to an increase in the dot percentage (see FIG. 35) according to the Yule-Nielsen model, whereas, in practice, the spectral reflectance does not monotonously decrease with respect to the increase in the dot percentage (see FIG. 36). Therefore, in a case in which the Yule-Nielsen model is used, color prediction is not performed with sufficient accuracy.

SUMMARY OF THE INVENTION

In view of the above circumstances, an object of the present invention is to enable highly accurate prediction of a color of a patch to be included in a CxF chart so that a color obtained by overprinting inks of a plurality of colors can be predicted at lower cost and with fewer man-hours than ever before.

One aspect of the present invention is directed to a color prediction method for predicting a color of each of a plurality of patches corresponding to ink densities of a plurality of levels when a color chart including the plurality of patches is made by applying an ink of a prediction target color on a base material with ink densities of the plurality of levels, the color prediction method comprising:

a similar color selection step of selecting, as a similar color, a color close to the prediction target color from among a plurality of sample colors for which spectral characteristics of the plurality of patches are obtained;

a relational equation calculation step of obtaining, for the similar color, a relational equation representing a relationship between spectral characteristics of a reference patch and spectral characteristics of a color prediction target patch that is a patch other than the reference patch, the reference patch being a patch having a maximum ink density from among the plurality of patches; and a spectral characteristic prediction step of obtaining predicted values of spectral characteristics of the color prediction target patch for the prediction target color by applying spectral characteristics of the reference patch for the prediction target color to the relational equation.

According to such a configuration, a color close to the prediction target color is selected as a similar color from among a plurality of sample colors that have been subjected to colorimetry, and a relational equation representing the relationship between the spectral characteristics of the reference patch and the spectral characteristics of the color prediction target patch is obtained for the selected similar color. Then, predicted values of the spectral characteristics of the color prediction target patch for the prediction target color are obtained by applying the spectral characteristics of the reference patch for the prediction target color to the relational equation. Since the spectral characteristics are predicted on the basis of the "relationship between the spectral characteristics of the reference patch and the spectral characteristics of the color prediction target patch" for a color close to the prediction target color as described above, accurate predicted values can be obtained. That is, without printing a color chart (a color chart including a plurality of patches corresponding to ink densities of a plurality of levels) using an ink of the prediction target color, the spectral characteristics of each patch when it is assumed that the color chart is printed can be obtained with high accuracy. Therefore, printing of color charts and colorimetry thereof are not necessary. As above, it is possible to highly accurately predict a color of a patch to be included in the color chart so that a color obtained by overprinting inks of a plurality of colors can be predicted at lower cost and with fewer man-hours than ever before.

Another aspect of the present invention is directed to a color prediction method for predicting a color of each of a plurality of patches corresponding to ink densities of a plurality of levels when a color chart including the plurality of patches is made by applying an ink of a prediction target color on a base material with ink densities of the plurality of levels, the color prediction method including:

a relational equation calculation step of obtaining, for a plurality of sample colors for which spectral characteristics of the plurality of patches are obtained, a relational equation representing a relationship between spectral characteristics of a reference patch and spectral characteristics of a color prediction target patch that is a patch other than the reference patch, the reference patch being a patch having a maximum ink density from among the plurality of patches;

a similar color selection step of selecting, as a similar color, a color close to the prediction target color from among the plurality of sample colors; and a spectral characteristic prediction step of obtaining predicted values of spectral characteristics of the color prediction target patch for the prediction target color by applying spectral characteristics of the reference patch for the prediction target color to the relational equation for the sample color selected as the similar color in the similar color selection step.

Still another aspect of the present invention is directed to a color prediction method for predicting a color of each of a plurality of patches corresponding to ink densities of a plurality of levels when a color chart including the plurality of patches is made by applying an ink of a prediction target color on a base material with ink densities of the plurality of levels, the color prediction method including:

a similar color selection step of selecting, as a similar color, a color close to the prediction target color from among a plurality of sample colors for which spectral characteristics of the plurality of patches are obtained; and a spectral characteristic prediction step of obtaining predicted values of spectral characteristics of the color prediction target patch for the prediction target color by performing linear interpolation based on spectral characteristics of a reference patch for the prediction target color using a relationship between spectral characteristics of the reference patch for the similar color and spectral characteristics of a color prediction target patch that is a patch other than the reference patch for the similar color, the reference patch being a patch having a maximum ink density from among the plurality of patches.

These and other objects, features, modes, and advantageous effects of the present invention will become more apparent from the following detailed description of the present invention with reference to the accompanying drawings.

DETAILED DESCRIPTION OF PREFERRED EMBODIMENTS

<0. Introduction>

Figure 1:
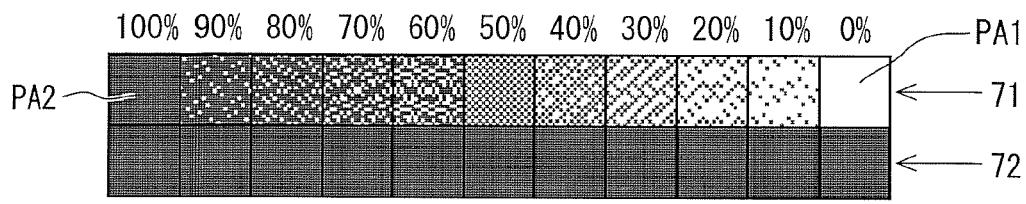
FIG. 1 is a diagram for describing terms used in this specification regarding a CxF chart.

Prior to describing embodiments, the background to the idea of the present invention will be described. It should be noted that, in the following, each of upper patches in the CxF chart (each of patches in the part denoted by reference numeral 71 in FIG. 1) (a patch obtained by printing a target ink on a base material) is referred to as a "first type patch", and each of lower patches in the CxF chart (each of patches in the part denoted by reference numeral 72 in FIG. 1) (a patch obtained by printing a target ink on black) is referred to as a "second type patch". Also, a patch representing the color of the base material itself (a patch marked with PA1 in FIG. 1) is referred to as a "paper white patch", and a patch obtained by solidly applying the target ink all over the base material (a patch marked with PA2 in FIG. 1) is referred to as a "solid patch".

As described above, the colorimetry result (colorimetric value) of the CxF chart is required to predict a color obtained by overprinting a plurality of color inks including a spot color ink. In this regard, spectral reflectances which are colorimetric values can be relatively easily obtained for the solid patch PA2 and the paper white patch PA1 among 22 patches constituting the CxF chart. It should be noted that, in the following, a case in which the spectral reflectances are obtained in 10 nm increments in the wavelength range of 380 to 730 nm (namely, a case in which one color is specified by 36 spectral reflectances) will be described. However, it is not limited thereto. A neural network prediction method described below and an embodiment (including modifications) described below can be applied to a case in which spectral reflectances are obtained, the number of the spectral reflectances is obtained by dividing a wavelength range including a range from 400 nm to 700 nm by a unit wavelength range of an appropriate size.

The spectral reflectances of the solid patch PA2 can be obtained, for example, by performing colorimetry of a portion of the corresponding color included in a colored ball or printed matter. Further, the spectral reflectances of the solid patch PA2 can be substituted with the spectral reflectances obtained by colorimetry of the color sample of the corresponding color. This is because the color sample represents a target color when the corresponding color is solidly applied.

The spectral reflectances of the paper white patch PA1 are obtained by colorimetry of a portion on the base material where nothing is printed. Further, as long as the same paper is used as the base material when performing printing, each of the spectral reflectances of the paper white patch PA1 is constant regardless of an ink color. Therefore, even when processing is performed for a plurality of color inks, the spectral reflectances of the paper white patch PA1 needs to be measured only once, as long as the same paper is used. Note that the configuration may be such that spectral reflectances of the paper white patches PA1 of a plurality of CxF charts are measured and the average values thereof are used as the representative values of the respective spectral reflectances of the paper white patch PA1.

Regarding 20 patches among 22 patches constituting the CxF chart except for the solid patch PA2 and the paper white patch PA1, the accurate spectral reflectances cannot be obtained unless the colorimetry of the matter actually printed on the base material or black is performed. However, focusing on a plurality of spot colors having similar colors, in regard to each of the 20 patches described above, the respective spectral reflectances for the plurality of spot colors are considered to be close to each other. As long as the same paper is used as the base material when performing printing, it is considered that the spectral reflectances of the solid patch PA2 and the spectral reflectances of each of the 20 patches have a certain relationship.

In view of the above, the applicant of the present invention has attempted a method (hereinafter referred to as a "neural network prediction method" for convenience) in which the above 20 patches are taken as color prediction target patches, and after the relationship between the spectral reflectances of the solid patch PA2 and the spectral reflectances of each of the color prediction target patches is learned by a neural network, the spectral reflectances of each of the color prediction target patches for a prediction target color are predicted using the learned neural network. It should be noted that, since one color is specified by, for example, 36 spectral reflectances as described above, in the following, a series of processes for predicting spectral reflectances will be referred to as a "color prediction process".

According to a color prediction process using the neural network prediction method, although predicted values having no problem for practical use are obtained for the second type patches 72 among the 20 patches, sufficiently accurate predicted values cannot be obtained for the first type patches 71 among the 20 patches particularly when there is little data used for learning. Therefore, the applicant has decided to perform a color prediction process using a method based on another novel idea (method described in the embodiment (including modifications) of the present invention) in regard to the first type patches 71. In regard to the second type patches 72, color prediction is performed by a color prediction process using the neural network prediction method. Hereinafter, the neural network prediction method (in the case of performing color prediction for only the second type patch 72) will be described, and then an embodiment of the present invention will be described.

First, the overview of the neural network prediction method will be described with reference to FIG. 1 and FIG. 2. As described above, the spectral reflectances can be relatively easily obtained for the solid patch PA2 among the patches constituting the CxF chart. Therefore, a color prediction model for predicting the spectral reflectances of the color prediction target patch from the spectral reflectances of the solid patch PA2 is constructed taking the second type patch 72 as the color prediction target patch. Then, using the constructed color prediction model, the spectral reflectances of the color prediction target patch for the prediction target color are predicted.

Figure 2:
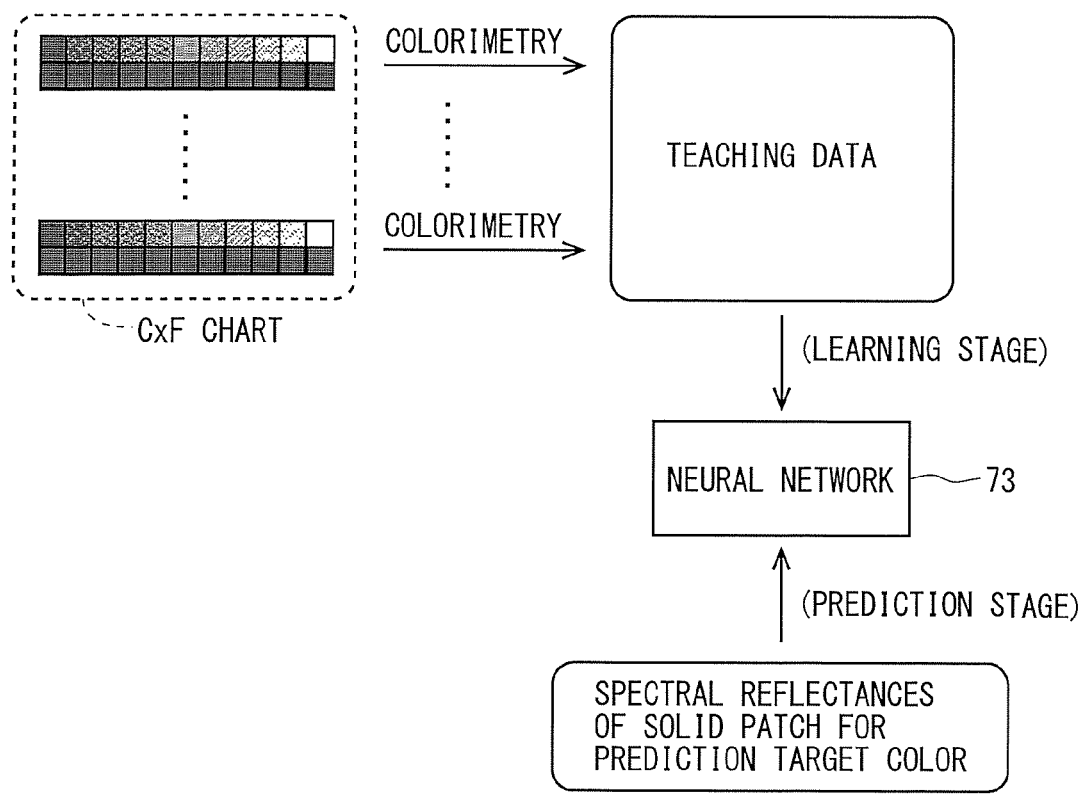
FIG. 2 is a diagram for describing an overview of a neural network prediction method.

The color prediction model is implemented by a neural network 73 that performs machine learning (see FIG. 2). The color prediction process is roughly classified into a learning stage process and a prediction (inference) stage process. In the learning stage, teaching data (training data) is given to the neural network 73, and machine learning using the teaching data is performed in the neural network 73. The neural network 73 is given, as teaching data, spectral reflectances obtained by colorimetry of the patches in the CxF chart. It should be noted that, here, one piece of teaching data is composed of 36 spectral reflectances obtained by colorimetry of the solid patch PA2 and 36 spectral reflectances obtained by colorimetry of one color prediction target patch. In the prediction stage, the spectral reflectances of the solid patch PA2 for the prediction target color are given to the learned neural network 73. As a result, the spectral reflectances (predicted values) of the color prediction target patch for the prediction target color are outputted from the neural network 73.

By using this color prediction model, color values (spectral reflectances) of each patch (each of the second type patches 72 in this example) when the CxF chart is assumed to be printed can be obtained also for a spot color for which the CxF chart is not printed.

Figure 3:
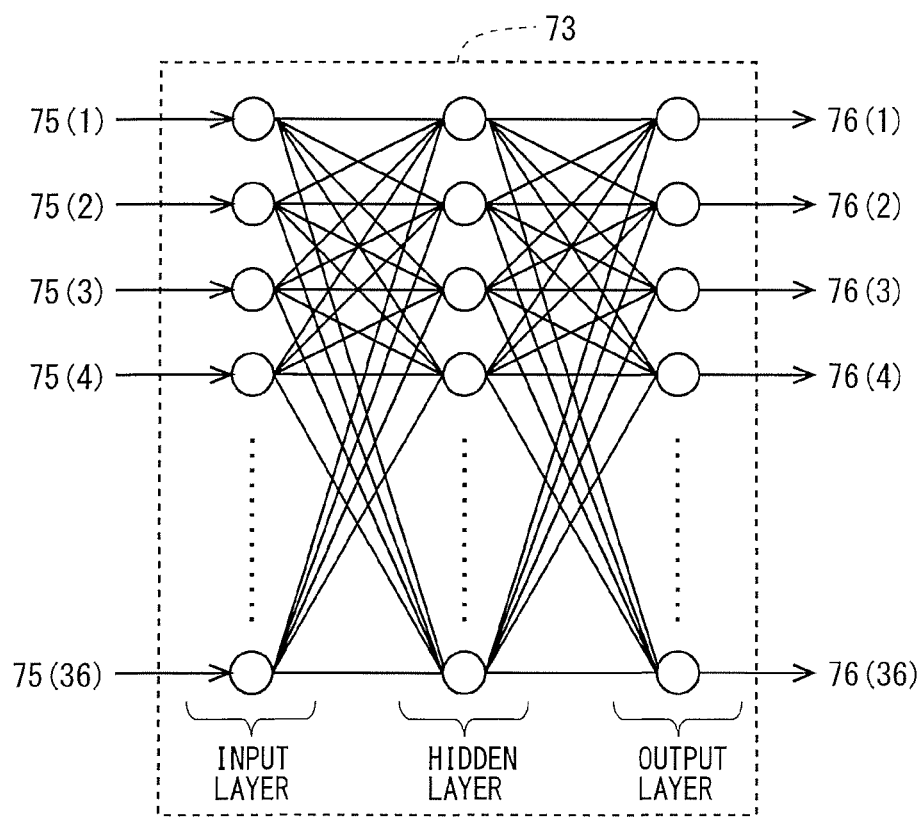
FIG. 3 is a diagram showing an example of the structure of a neural network used in the neural network prediction method.

FIG. 3 is a diagram showing an example of the structure of the neural network 73 used in the neural network prediction method. The neural network 73 includes an input layer, a hidden layer (intermediate layer), and an output layer. The input layer is composed of 36 units (neurons) that receive 36 spectral reflectances 75(1) to 75(36). The hidden layer is also composed of 36 units. Note that the number of units in the hidden layer is not limited to 36. In addition, although the number of hidden layers is 1 in the example shown in FIG. 3, the number of hidden layers may be 2 or more. The output layer is composed of 36 units that output 36 spectral reflectances 76(1) to 76(36).

The input layer and the hidden layer are fully connected, and the hidden layer and the output layer are also fully connected. A sigmoid function is adopted as the activation function for the hidden layer and the output layer. However, a function other than the sigmoid function may be adopted as the activation function.

Figure 4:
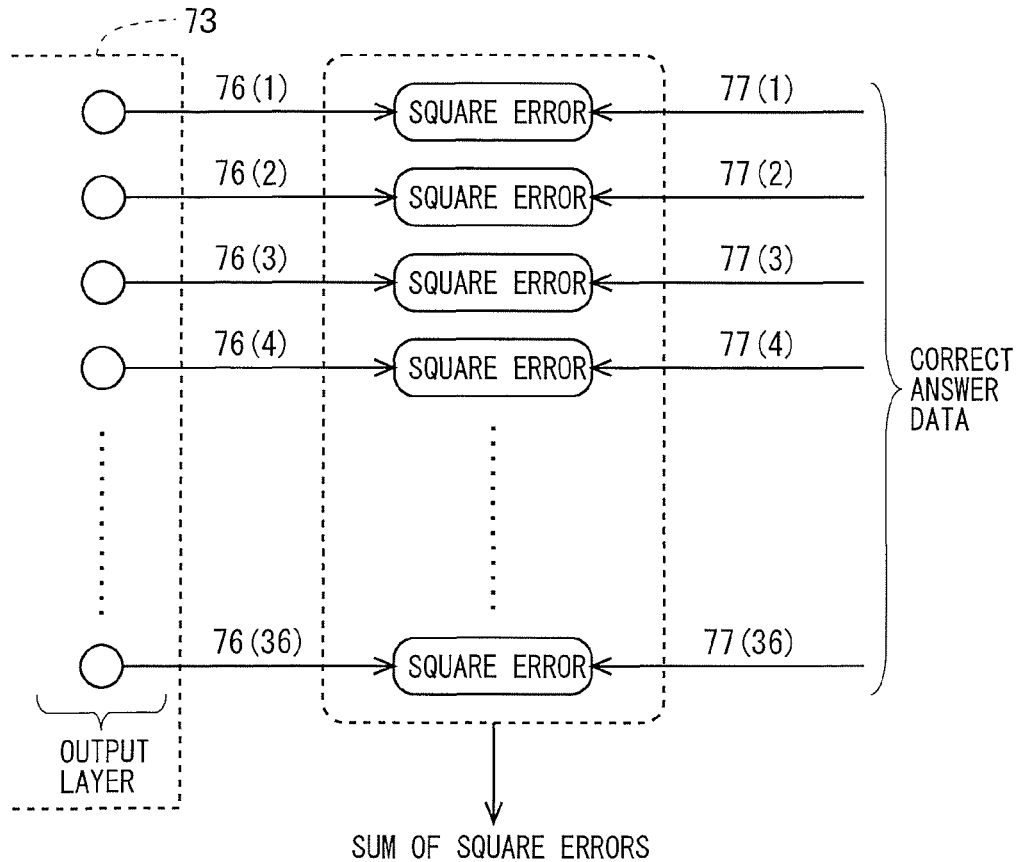
FIG. 4 is a diagram for describing a process of the neural network prediction method during learning.

When performing learning using this neural network 73, the spectral reflectances 75(1) to 75(36) are given to the input layer. As a result, forward propagation processing is performed in the neural network 73, and the sum of square errors of the spectral reflectances 76(1) to 76(36) outputted from the output layer and the spectral reflectances 77(1) to 77(36) which are correct answer data is obtained (see FIG. 4). Then, the parameters (weighting coefficients, biases) of the neural network 73 are updated by using the gradient descent method on the basis of the result obtained by the back propagation processing of the errors. The above parameters are optimized by repeating the learning as described above. It should be noted that, as a learning method, batch learning may be used in which all pieces of teaching data are given to the neural network 73 in a collective manner, mini-batch learning may be used in which teaching data is divided into a plurality of group, and the teaching data is given to the neural network 73 for each group, or online learning may be used in which teaching data is given to the neural network 73 one by one.

When performing prediction (inference) using this neural network 73, the spectral reflectances 75(1) to 75(36) of the solid patch PA2 for the prediction target color are given to the input layer. Then, the spectral reflectances 76(1) to 76(36) outputted from the output layer by the forward propagation processing in the neural network 73 are treated as the predicted values of the spectral reflectances of the color prediction target patch for the prediction target color.

Figure 5:
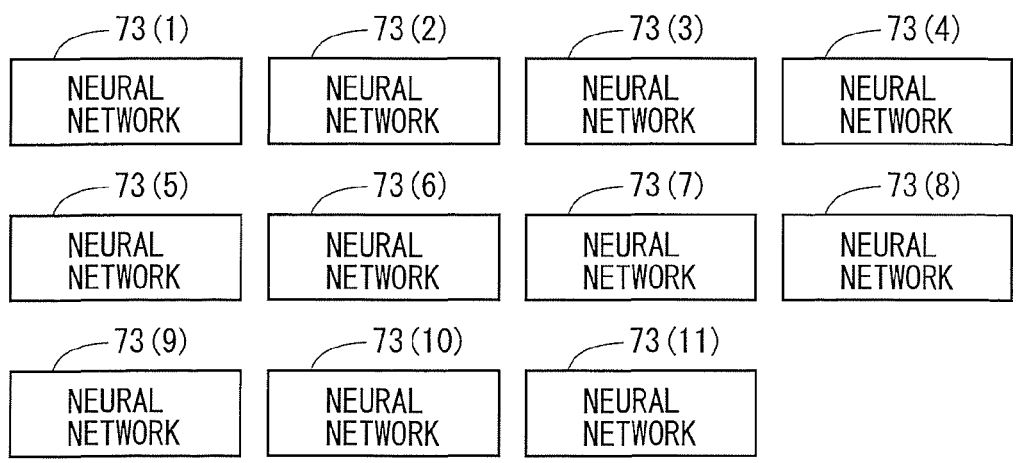
FIG. 5 is a diagram for describing that the neural network is prepared for each color prediction target patch regarding the neural network prediction method.

Meanwhile, the neural network 73 shown in FIG. 3 is prepared for each color prediction target patch. In this example, since 11 patches (second type patches 72) are taken as color prediction target patches, 11 neural networks 73(1) to 73(11) are prepared as shown in FIG. 5. Then, learning and prediction (inference) are performed for each color prediction target patch using the corresponding neural network 73.

Figure 6:
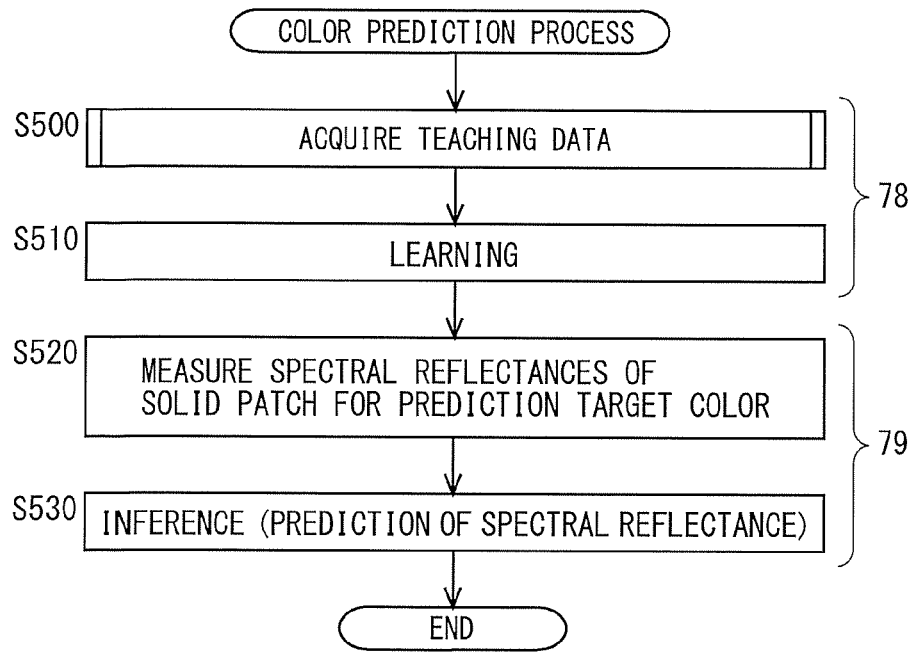
FIG. 6 is a flowchart showing the procedure of a color prediction process by the neural network prediction method.
Figure 7:
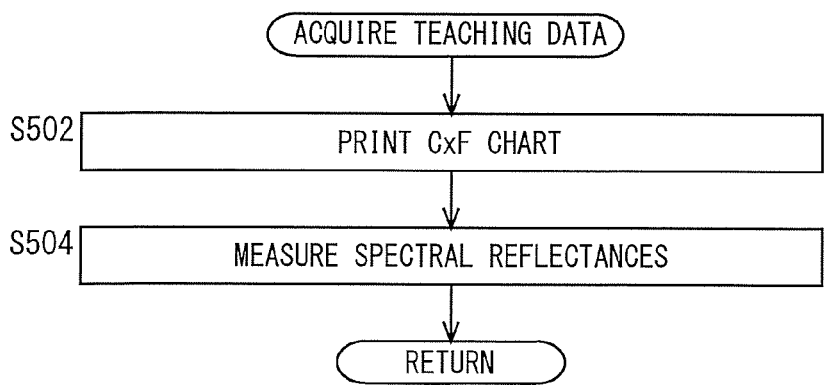
FIG. 7 is a flowchart showing a procedure for acquiring teaching data regarding the neural network prediction method.
Figure 8:
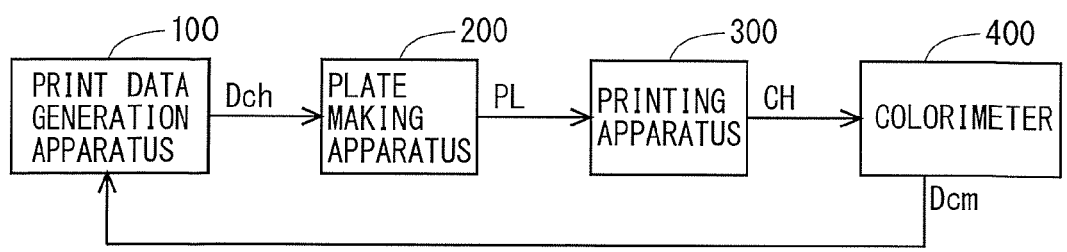
FIG. 8 is a block diagram for describing details of acquisition of the teaching data regarding the neural network prediction method.

Next, the procedure of the color prediction process by the neural network prediction method will be described with reference to the flowcharts shown in FIG. 6 and FIG. 7. As shown in FIG. 6, first, a process of acquiring teaching data necessary for learning in the neural network 73 to be constructed as a color prediction model is performed (step S500). In the step S500, it is preferable to acquire a sufficient number of teaching data pieces so that spectral reflectances are accurately predicted. Specifically, as shown in FIG. 7, the step S500 includes a step of printing a CxF chart (step S502) and a step of measuring spectral reflectances (step S504). The processes in the step S502 and the step S504 will be described in detail with reference to FIG. 8.

In the step S502, first, print data Dch for outputting the CxF chart is created by the print data generation apparatus 100, and the print data Dch is sent to the plate making apparatus 200. The plate making apparatus 200 produces a printing plate PL on the basis of the print data Dch. Then, the printing apparatus 300 performs printing using the printing plate PL. Thus, the CxF chart CH is outputted from the printing apparatus 300.

In the step S504, the colorimeter 400 performs colorimetry of the patches included in the CxF chart CH printed in the step S502. Colorimetric data Dcm obtained by the colorimetry by the colorimeter 400 is sent to the print data generation apparatus 100. The colorimeter 400 used in this example is a spectral colorimeter. Therefore, the colorimetric data Dcm obtained by the colorimetry is spectral reflectance data. In this example, spectral reflectance data is obtained in 10 nm increments in the wavelength range of 380 to 730 nm. Accordingly, 36 pieces of spectral reflectance data are obtained by performing the colorimetry of any one of the patches in the CxF chart CH.

After acquiring the teaching data, machine learning using the teaching data obtained in the step S500 is performed by the neural network 73 (step S510). As described above, this machine learning is performed using the corresponding neural network 73 for each color prediction target patch. By machine learning in the step S510, the parameters (weighting coefficients, biases) of the neural network 73 are optimized. The neural network 73 having the optimized parameters serves as a color prediction model used for color prediction. In this manner, in the step S510, a color prediction model for predicting the color of a patch in the CxF chart is constructed.

Note that the processes in the step S500 and the step S510 (the processes marked with reference numeral 78 in FIG. 6) need to be performed only once, and do not need to be performed for each process for one prediction target color. On the other hand, the processes in the step S520 and the step S530 (the processes marked with reference numeral 79 in FIG. 6) need to be performed for each process for one prediction target color.

In the step S520, the spectral reflectances of the solid patch PA2 for the prediction target color are measured using the colorimeter 400. As described above, the spectral reflectances of the solid patch can be obtained, for example, by performing colorimetry of a portion of the corresponding color included in a colored ball or printed matter. Further, the spectral reflectances of the solid patch can be substituted with the spectral reflectances of the color sample of the corresponding color.

Next, the spectral reflectances (predicted values) of the color prediction target patch for the prediction target color are obtained by giving, as input data, the spectral reflectances obtained in the step S520 to the neural network 73 serving as the color prediction model constructed in the step S510 (step S530). In the step S530, 36 spectral reflectances are obtained for each of the 11 color prediction target patches. From the above, even if the CxF chart for the prediction target color is not actually printed, the spectral reflectances of all second type patches 72 when the CxF chart is assumed to be printed can be obtained.

Color prediction for the second type patches 72 in the CxF chart is performed using the neural network prediction method described above. It should be noted that, in a case in which the simple CxF chart is used, since it is not necessary to perform color prediction for the second type patches 72, the configuration may be such that color prediction is performed for only the first type patches 71 using the method described in the following embodiment (including modifications).

An embodiment of the present invention will now be described with reference to the accompanying drawings.

<1. Overall Configuration of Printing System>

Figure 9:
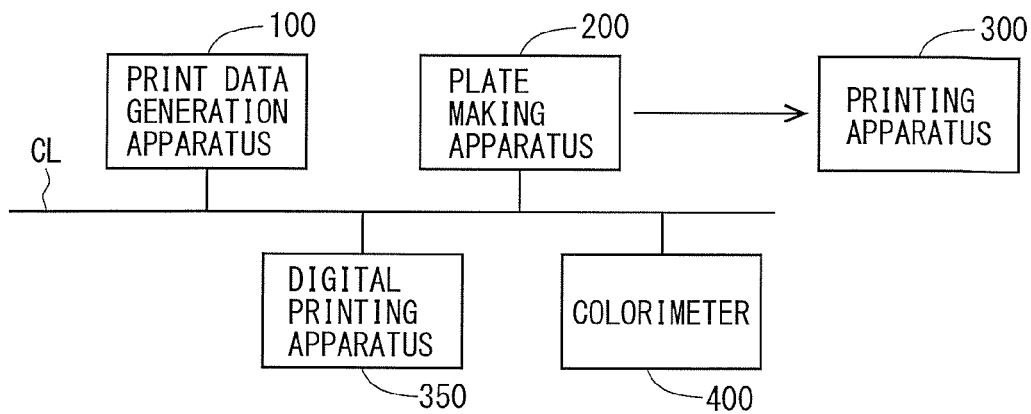
FIG. 9 is a diagram showing an overall configuration of a printing system according to one embodiment of the present invention.

FIG. 9 is a diagram showing an overall configuration of a printing system according to one embodiment of the present invention. The printing system includes: a print data generation apparatus 100 that generates print data by performing various processes on submitted data such as a PDF file; a plate making apparatus 200 that produces a printing plate on the basis of the print data; a printing apparatus 300 that performs printing using the printing plate manufactured by the plate making apparatus 200; a digital printing apparatus 350 such as an inkjet printer or copier that performs printing on the basis of the print data which is digital data without using the printing plate; and a colorimeter 400 for measuring a color. The print data generation apparatus 100, the plate making apparatus 200, the digital printing apparatus 350, and the colorimeter 400 are communicably interconnected by a communication line CL. Note that the colorimeter 400 used in the present embodiment is a spectral colorimeter.

In the present embodiment, the print data generation apparatus 100 performs a color prediction process for predicting a color of each patch when a CxF chart is assumed to be generated by applying ink of a prediction target color (any spot color ink) on a base material with ink densities of a plurality of levels. Specifically, predicted values of color values (spectral reflectances) of each of nine patches excluding the paper white patch PA1 and the solid patch PA2 among the eleven first type patches 71 are obtained by the color prediction process (see FIG. 1). That is, these nine patches are taken as color prediction target patches. The spectral reflectances of the paper white patch PA1 and the solid patch PA2 can be relatively easily obtained as described above. It should be noted that, in the present embodiment, the solid patch PA2 corresponds to a reference patch.

Further, the print data generation apparatus 100 performs an overprint prediction process for predicting a color obtained by overprinting inks of a plurality of colors (typically, a color of a portion where a plurality of spot color inks are overprinted or a portion where a spot color ink and a process color ink are overprinted). In the overprint prediction process, results of the color prediction process (predicted values of spectral reflectances) are used as necessary. Furthermore, the print data generation apparatus 100 also performs a process for converting the data obtained by the overprint prediction process into print data in a format that can be printed by the digital printing apparatus 350. It should be noted that, as a specific method of the overprint prediction process, the above-described Deshpande et al. method may be employed, or another method may be employed.

<2. Configuration of Print Data Generation Apparatus>

Figure 10:
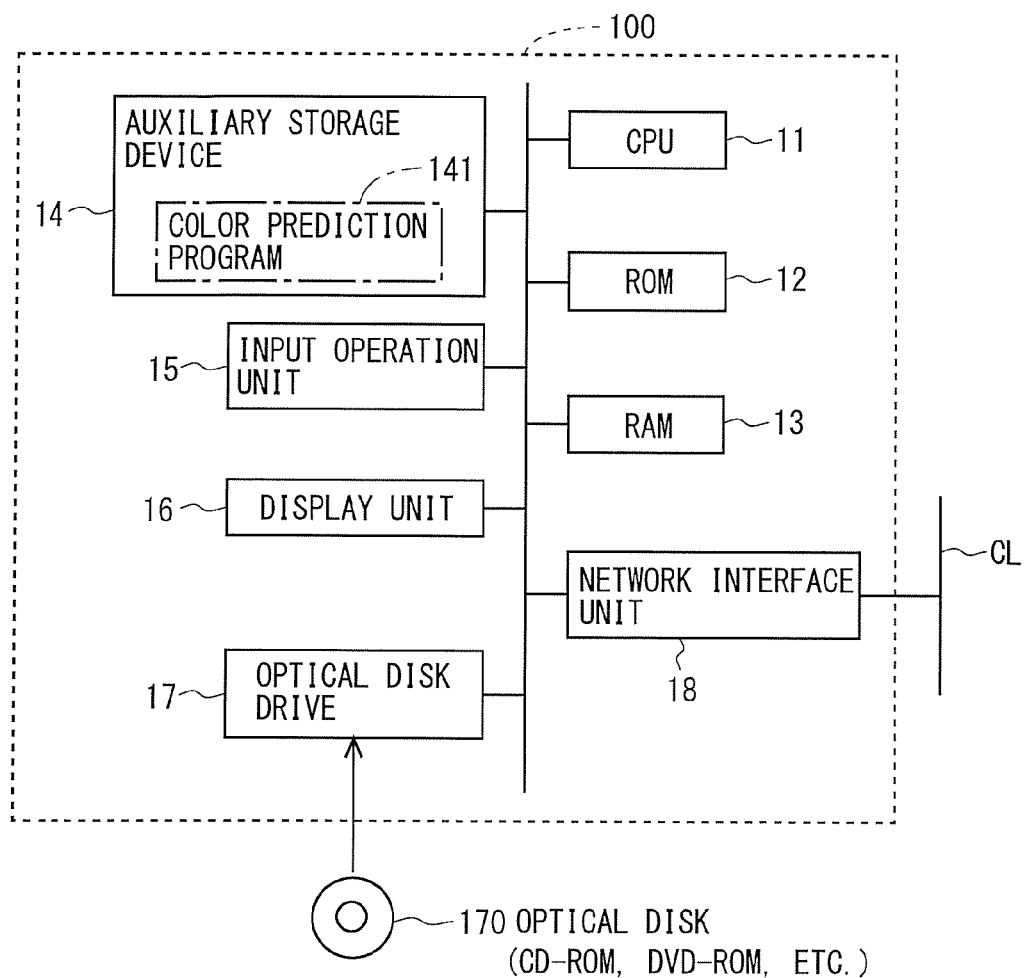
FIG. 10 is a diagram showing a hardware configuration of a print data generation apparatus in the embodiment.

FIG. 10 is a diagram showing a hardware configuration of the print data generation apparatus 100 in the present embodiment. The print data generation apparatus 100 is implemented by a personal computer, and includes a CPU 11, a ROM 12, a RAM 13, an auxiliary storage device 14, an input operation unit 15 such as a keyboard, a display unit 16, an optical disk drive 17, and a network interface unit 18. The submitted data transmitted through the communication line CL is inputted into the print data generation apparatus 100 via the network interface unit 18. Print data generated by the print data generation apparatus 100 is sent to the digital printing apparatus 350 through the communication line CL via the network interface unit 18.

A color prediction program 141 for performing the color prediction process is stored in the auxiliary storage device 14. The color prediction program 141 is provided by being stored in a computer readable recording medium such as a CD-ROM or a DVD-ROM. That is, a user purchases, for example, an optical disk (CD-ROM, DVD-ROM, etc.) 170 as a recording medium for the color prediction program 141, mounts the optical disk 170 on the optical disk drive 17, reads the color prediction program 141 from the optical disk 170, and installs the read program in the auxiliary storage device 14. Alternatively, the color prediction program 141 sent through the communication line CL may be received by the network interface unit 18 and installed in the auxiliary storage device 14.

<3. Color Prediction Method>

A color prediction process for implementing the color prediction method according to the present embodiment will now be described. It should be noted that this color prediction process is performed by executing the color prediction program 141 by the print data generation apparatus 100.

<3.1 Schematic Procedure>

Figures 11, 12:
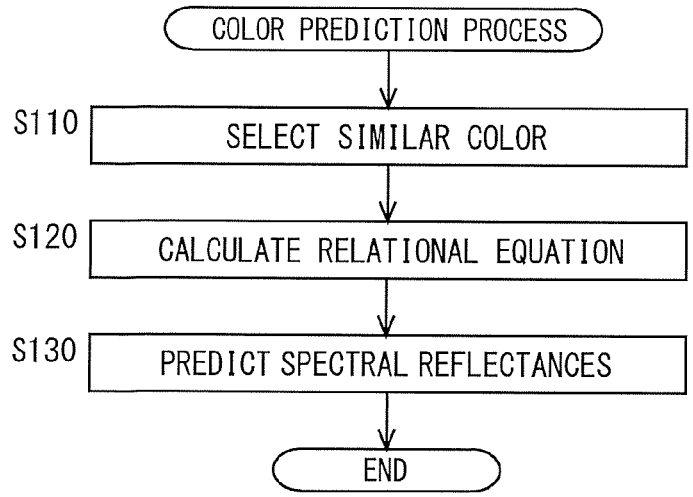
FIG. 11 is a flowchart showing a schematic procedure of a color prediction process in the embodiment.
FIG. 12 is a diagram for describing selection of a similar color in the embodiment.

FIG. 11 is a flowchart showing a schematic procedure of the color prediction process according to the present embodiment. It should be noted that printing of CxF charts (the simple CxF chart may be used) for the suitable number of colors (hereinafter referred to as "sample colors") and colorimetry thereof need to be performed before this color prediction process is performed. In other words, the spectral reflectances of each of the first type patches 71 for each of a plurality of sample colors need to be obtained before the color prediction process is performed. As sample colors, 32 spot colors are used, for example. Further, with respect to the prediction target color (processing target color), the spectral reflectances in a state where the ink of the prediction target color is solidly applied on the base material need to be obtained before the color prediction process is performed. In other words, the spectral reflectances of the solid patch PA2 for the prediction target color need to be obtained before the color prediction process is performed. Hereinafter, the flow shown in FIG. 11 will be described.

First, a color close to the prediction target color is selected as a similar color from among a plurality of sample colors on the basis of the spectral reflectance data obtained before performing the color prediction process (step S110). For example, in a case in which 32 spot colors are prepared as the sample colors, one of the 32 spot colors close to the prediction target color is selected as a similar color.

Next, a relational equation (an approximate equation) representing the relationship between the spectral reflectances of the solid patch PA2 and the spectral reflectances of the color prediction target patch is obtained for the similar color (sample color selected in the step S110) (step S120). This relational equation is obtained for each color prediction target patch. In the present embodiment, there are nine color prediction target patches, and therefore, nine relational equations are obtained by the process in the step S120.

Finally, predicted values of the spectral reflectances of the color prediction target patch for the prediction target color are obtained by applying the spectral reflectances of the solid patch PA2 for the prediction target color to the relational equation obtained in the step S120 (step S130). In the present embodiment, since there are nine color prediction target patches, the spectral reflectances of the solid patch PA2 for the prediction target color are applied to nine relational equations. Thus, the predicted values of the spectral reflectances of each of the nine color prediction target patches are obtained for the prediction target color.

In the above-described manner, even if the CxF chart is not actually printed using the ink of the prediction target color, the spectral reflectances of all the first type patches 71 when the CxF chart is assumed to be printed are obtained. Now, the process of each step in FIG. 11 will be described in detail.

<3.2 Selection of Similar Color>

First, the process for selecting a similar color (the process in the step S110 in FIG. 11) will be described in detail. In the present embodiment, the spectral reflectance data of each patch constituting the CxF chart is composed of 36 reflectances in 10 nm increments in the wavelength range of 380 nm to 730 nm. Accordingly, regarding the prediction target color and the sample color, the spectral reflectance data of the solid patch PA2 is composed of 36 reflectances in 10 nm increments in the wavelength range of 380 nm to 730 nm. Therefore, a square error for the spectral reflectances of the solid patch PA2 between the prediction target color and each sample color is obtained on the basis of the 36 reflectances for the prediction target color and a corresponding sample color. Then, the sample color from which the least square error is obtained is selected as a similar color. Thus, in the present embodiment, a similar color is selected using the least square method.

Here, a variable $C_i$ (i is an integer of 1 or more) is used to distinguish a plurality of sample colors from each other, and the spectral reflectances (36 reflectances) of the solid patch PA2 for the sample color $C_i$ are represented as $Rs(i)(1)$ to $Rs(i)(36)$ (see FIG. 12). Further, the spectral reflectances (36 reflectances) of the solid patch PA2 for the prediction target color are represented as $Re(1)$ to $Re(36)$. Then, the square error $E(1)$ between the prediction target color and the first sample color $C_1$ is obtained by the following Equation (5).

$$E(1) = \sum_{j=1}^{36} \{Re(j) - Rs(1)(j)\}^2 \qquad (5)$$

Similarly, the square error $E(i)$ between the prediction target color and the ith sample color $C_i$ is obtained by the following Equation (6). Note that a weighting coefficient may be added for each wavelength.

$$E(i) = \sum_{j=1}^{36} \{Re(j) - Rs(i)(j)\}^2 \qquad (6)$$

As described above, first, the square error $E(i)$ regarding the spectral reflectances of the solid patch PA2 between the prediction target color and each of the plurality of sample colors $C_i$ prepared in advance is obtained. Then, a sample color corresponding to the least value among the obtained square errors $E(i)$ is selected as a similar color. Thus, in the present embodiment, the square error between the spectral reflectances of the solid patch PA2 for the prediction target color and the spectral reflectances of the solid patch PA2 for each sample color is obtained, and a sample color from which the least square error is obtained is selected as a similar color.

It should be noted that, as will be described later, the configuration may be such that a similar color is selected from a plurality of candidate colors that are some of a plurality of sample colors prepared in advance.

<3.3 Calculation of Relational Equation>

Figure 13:
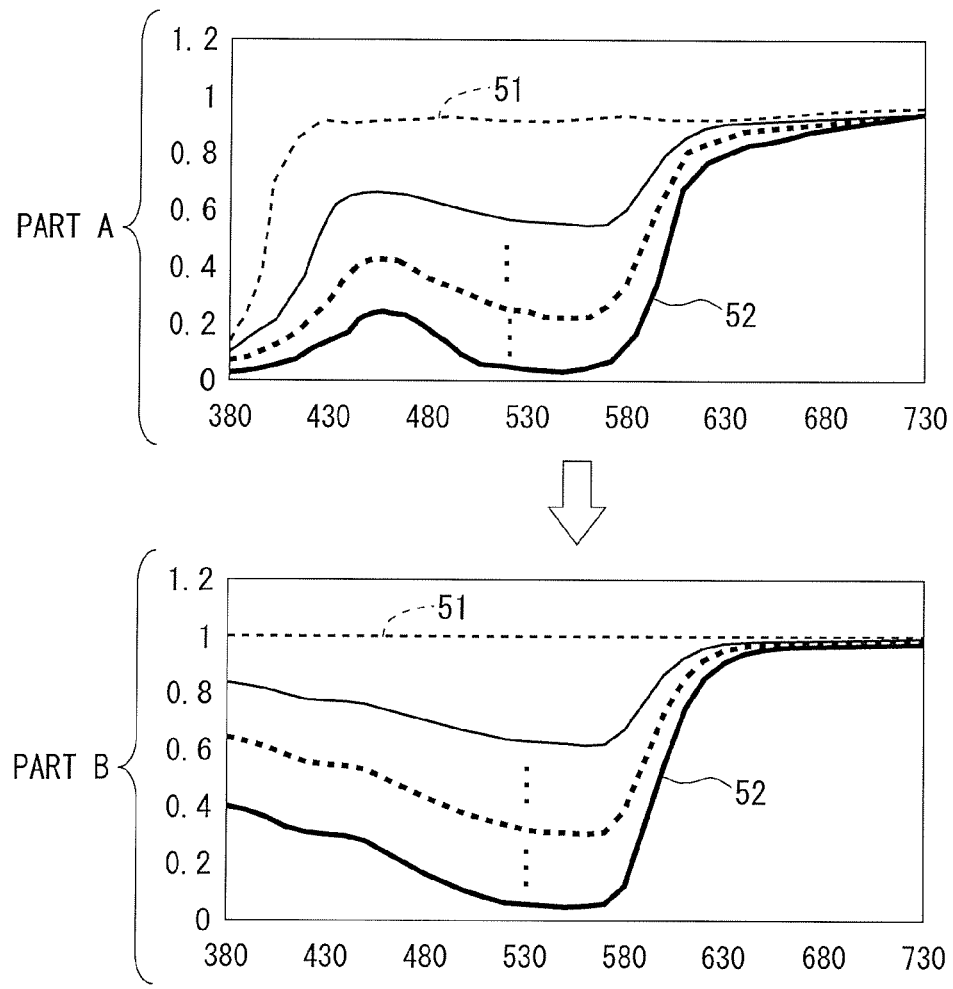
FIG. 13 is a diagram for describing normalization when a relational equation is calculated in the embodiment.

Next, the process for obtaining the relational equation (the process in the step S120 in FIG. 11) will be described in detail. In regard to the similar color, the colorimetric values of all the first type patches 71 including the paper white patch PA1 and the solid patch PA2 are obtained. That is, data corresponding to a curve (a curve representing spectral reflectances) as schematically shown in part A of FIG. 13 is obtained for all the first type patches 71 (in FIG. 13, the horizontal axis represents wavelength (unit: nm), and vertical axis represents reflectance). It should be noted that part A of FIG. 13 shows only curves corresponding to four patches among the first type patches 71 (the same applies to part B of FIG. 13). A curve denoted by reference numeral 51 is a curve for the paper white patch PA1, and a curve denoted by reference numeral 52 is a curve for the solid patch PA2. Such data is subjected to normalization with the spectral reflectances of the paper white patch PA1 being 1. As a result, data corresponding to curves (curves representing spectral reflectances) (however, a straight line in regard to the paper white patch PA1 that is the reference for normalization) as schematically shown in part B of FIG. 13 is obtained.

Figure 14:
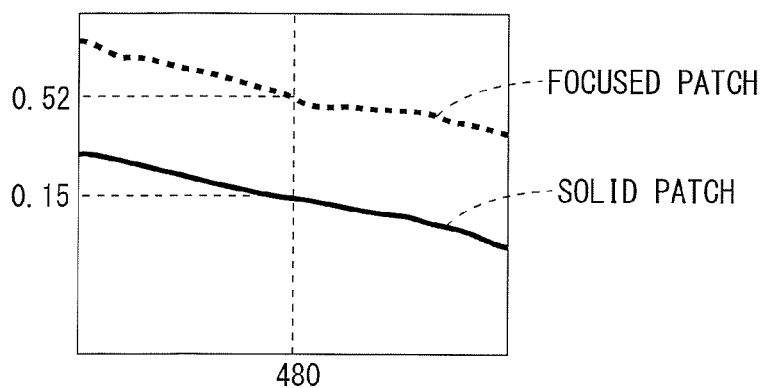
FIG. 14 is a diagram for describing combination data in the embodiment.
Figure 15:
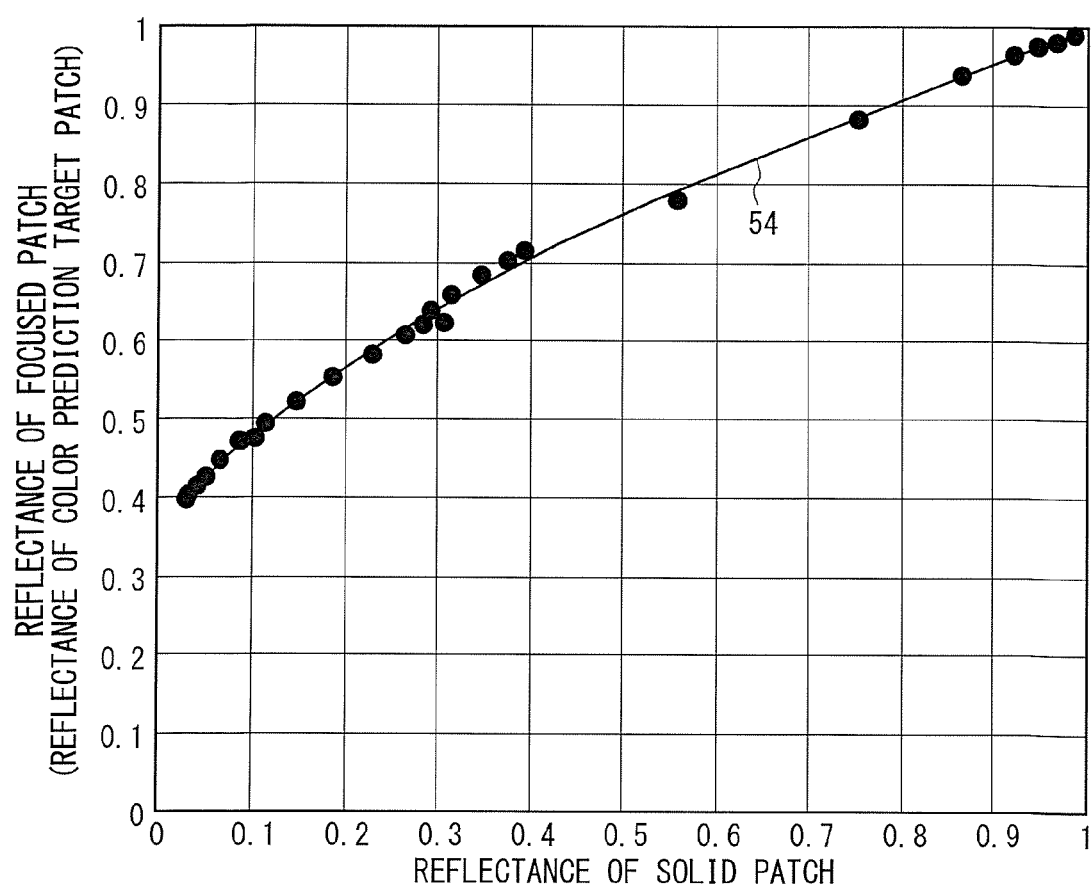
FIG. 15 is a diagram for describing calculation of the relational equation in the embodiment.
Figure 16:
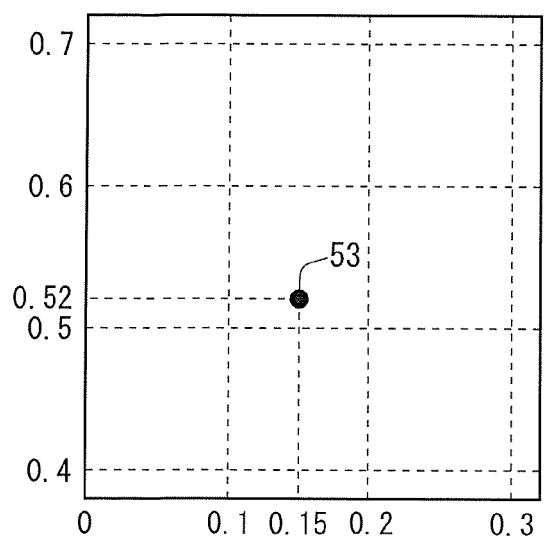
FIG. 16 is a diagram showing an example of one plot in the embodiment.

Here, we focus on one patch (hereinafter referred to as a "focused patch") from among nine color prediction target patches. Regarding the graph shown in part B of FIG. 13, it is assumed that the curves for the solid patch PA2 and the focused patch around the wavelength of 480 nm are as shown in FIG. 14. In this case, the reflectance of the solid patch PA2 is 0.15 and the reflectance of the focused patch is 0.52. In the present embodiment, such data obtained by combining the reflectance of the solid patch PA2 and the reflectance of the focused patch is treated as "combination data". Since the spectral reflectance data is composed of 36 reflectances as described above, 36 pieces of combination data of the reflectance (the reflectance after normalization) of the solid patch PA2 and the reflectance (the reflectance after normalization) of the focused patch are obtained. Each combination data is, as shown in FIG. 15, represented as one plot on a graph (hereinafter referred to as "relational graph" for convenience) in which the horizontal axis represents the reflectance of the solid patch PA2 and the vertical axis represents the reflectance of the focused patch. For example, the combination data based on the data shown in FIG. 14 is represented as a plot denoted by reference numeral 53 in FIG. 16 on the relational graph. Thus, in the present embodiment, 36 plots are presented on the relational graph. The calculation of the relational equation corresponds to obtaining a curve (for example, a curve denoted by reference numeral 54 in FIG. 15) passing through positions as close to the positions of these 36 plots as possible.

It should be noted that, in the example shown in part B of FIG. 13, the reflectance is minimal around the wavelength of 560 nm, and the reflectance of the same value appears at a wavelength larger than 560 nm and a wavelength smaller than 560 nm. Therefore, for example, when plot on the relational graph is sequentially performed in descending order of wavelength, turning-back of the locus occurs. However, as can be understood from FIG. 15, the relationship between the reflectance of the solid patch PA2 and the reflectance of the color prediction target patch is unchanged before and after the turning-back. From the above, it is considered that the reflectances of the color prediction target patch for the prediction target color can be accurately obtained from the reflectances of the solid patch PA2 for the prediction target color, using the "relationship between the reflectances of the solid patch PA2 and the reflectances of the color prediction target patch" for the similar color.

In view of the above, in the step S120 in FIG. 11, a relational equation representing the relationship between the spectral reflectances of the solid patch PA2 and the spectral reflectances of the focused patch (an approximate equation for obtaining approximate values of the spectral reflectances of the focused patch from the spectral reflectances of the solid patch PA2) is obtained on the basis of the 36 pieces of combination data described above. It should be noted that the relational equation is obtained by a known method. For example, the relational equation can be obtained by solving a simultaneous equation obtained from the 36 pieces of combination data by Gaussian elimination or Gauss-Jordan elimination. In this way, relational equations respectively corresponding to the nine color prediction target patches are obtained.

Meanwhile, in the present embodiment, a quintic equation is adopted as an approximate equation. As an example, a quintic equation such as the following Equation (7) is obtained by the process in the step S120 in FIG. 11. It should be noted that, in the following Equation (7), y is the reflectance of the color prediction target patch, and x is the reflectance of the solid patch PA2.

$$y=-0.321x^5+0.7136x^4-0.1681x^3-0.6897x^2+1.0892x+0.375 \qquad (7)$$

In the present embodiment, regarding the similar color selected in the step S110, quintic equations respectively corresponding to the nine first type patches 71 excluding the paper white patch PA1 and the solid patch PA2 are obtained as the relational equations used in the step S130, in the manner described above.

<3.4 Calculation of Spectral Reflectance>

Next, the process for obtaining the predicted values of the spectral reflectance (the process in the step S130 in FIG. 11) will be described in detail. At the start time of the process in the step S130, a quintic equation such as the above Equation (7) has been obtained as a relational equation for each color prediction target patch for the similar color. Further, as described above, the spectral reflectance data is composed of 36 reflectances. Therefore, in the step S130, for each color prediction target path, the 36 reflectances constituting spectral reflectance data of the solid patch PA2 for the prediction target color are substituted one by one into a corresponding relational equation (relational equation representing the relationship between the spectral reflectances of the solid patch PA2 and the spectral reflectances of the corresponding color prediction target patch), whereby 36 reflectances constituting the spectral reflectance data of the corresponding color prediction target patch for the prediction target color are obtained.

In the present embodiment, when the relational equation is calculated, normalization is performed so that the spectral reflectances of the paper white patch PA1 are 1. Therefore, the 36 reflectances obtained from the relational equation are subjected to denormalization (process for returning the normalized data to the data that has not been normalized) based on the actual spectral reflectances of the paper white patch PA1.

<3.5 Candidates when Similar Color is Selected>

Figure 17:
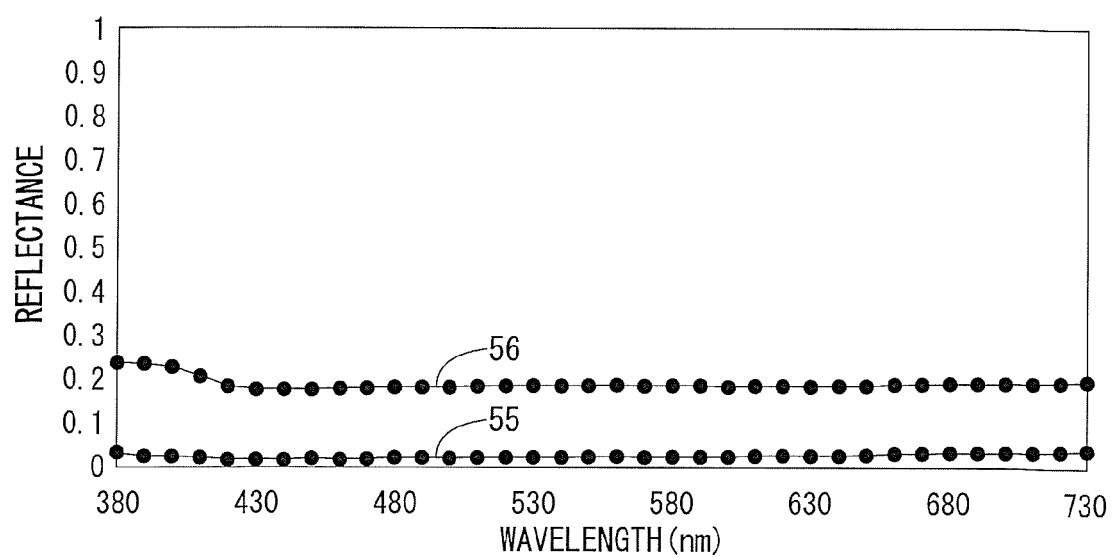
FIG. 17 is a diagram for describing necessity of selecting a similar color from among candidate colors regarding the embodiment.
Figure 18:
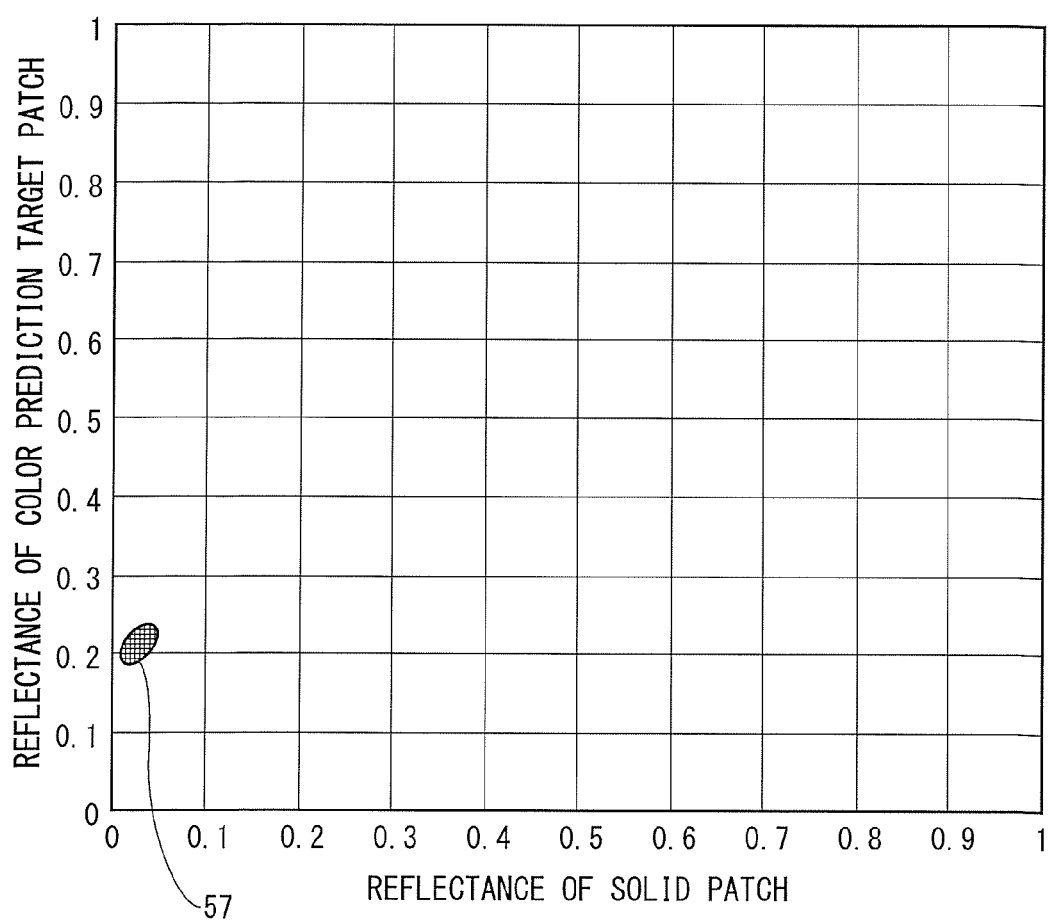
FIG. 18 is a diagram for describing necessity of selecting a similar color from among candidate colors regarding the embodiment.
Figure 19:
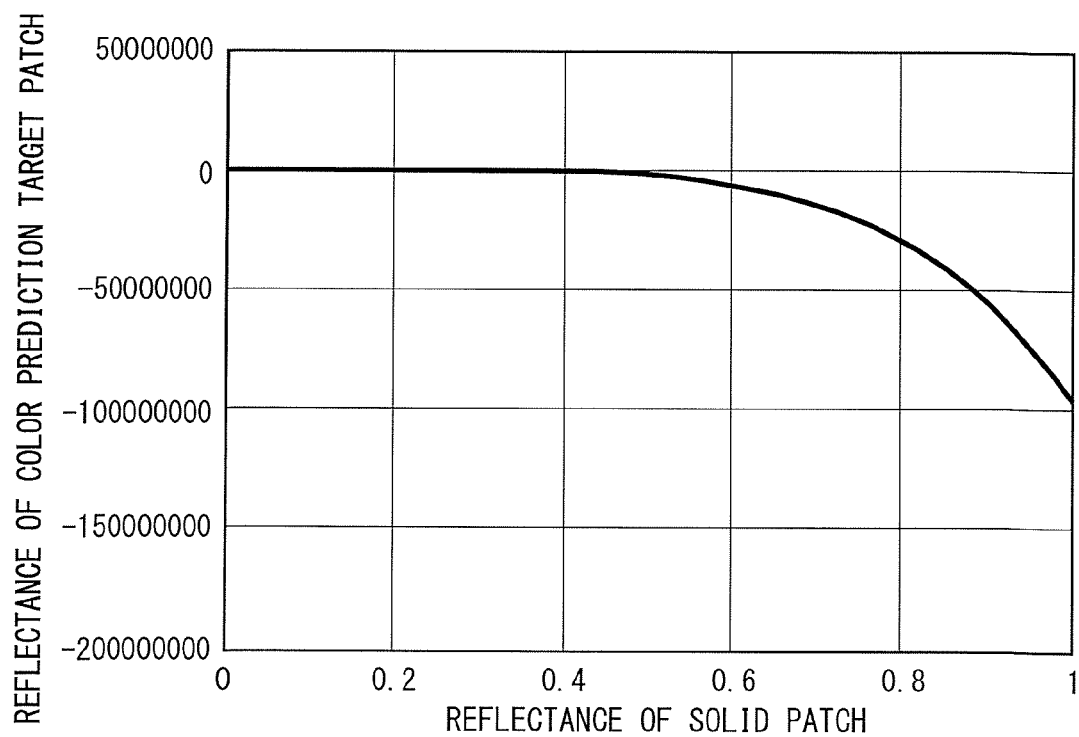
FIG. 19 is a diagram for describing necessity of selecting a similar color from among candidate colors regarding the embodiment.

Meanwhile, colorimetry of the first type patches 71 in the CxF chart was performed, focusing on a certain color close to black. Focusing on the colorimetric results of only the solid patch (at a dot percentage of 100%) PA2 and the color prediction target patch at a dot percentage of 70%, a graph as shown in FIG. 17 was obtained as a graph representing the spectral reflectances. In FIG. 17, a curve representing the spectral reflectances of the solid patch PA2 is denoted by reference numeral 55, and the curve representing the spectral reflectances of the color prediction target patch is denoted by reference numeral 56. According to the colorimetric results, the numerical range of the spectral reflectance of the solid patch PA2 is from 0.017 to 0.039. For this reason, on the above-described relational graph, the positions of the 36 plots corresponding to the combination data of the reflectance of the solid patch PA2 and the reflectance of the color prediction target patch are all within a very narrow range (the hatched portion denoted by reference numeral 57 in FIG. 18). When a relational equation is obtained on the basis of only combination data within such a narrow range, a curve as shown by a thick solid line in FIG. 19 is obtained as a curve representing the relational equation, for example. It is apparent from the curve shown in FIG. 19 that, when the reflectance of the solid patch for the prediction target color is larger than 0.5, the reflectance of the color prediction target patch for the prediction target color is not correctly predicted.

Figure 20:
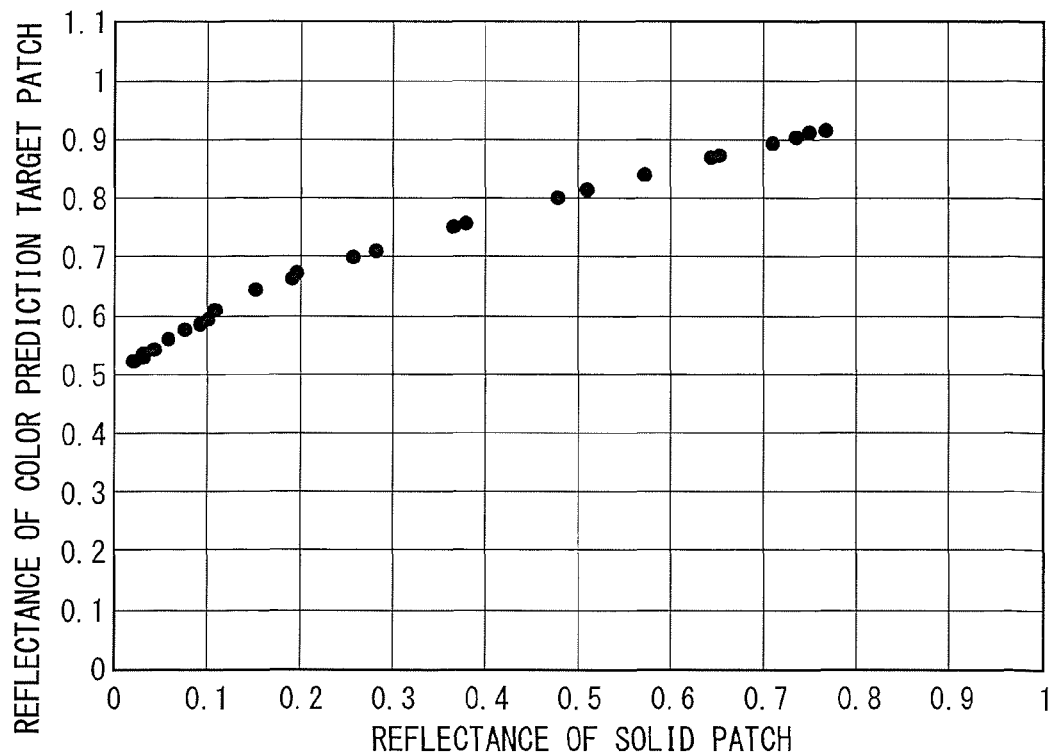
FIG. 20 is a diagram for describing necessity of selecting a similar color from among candidate colors regarding the embodiment.
Figure 21:
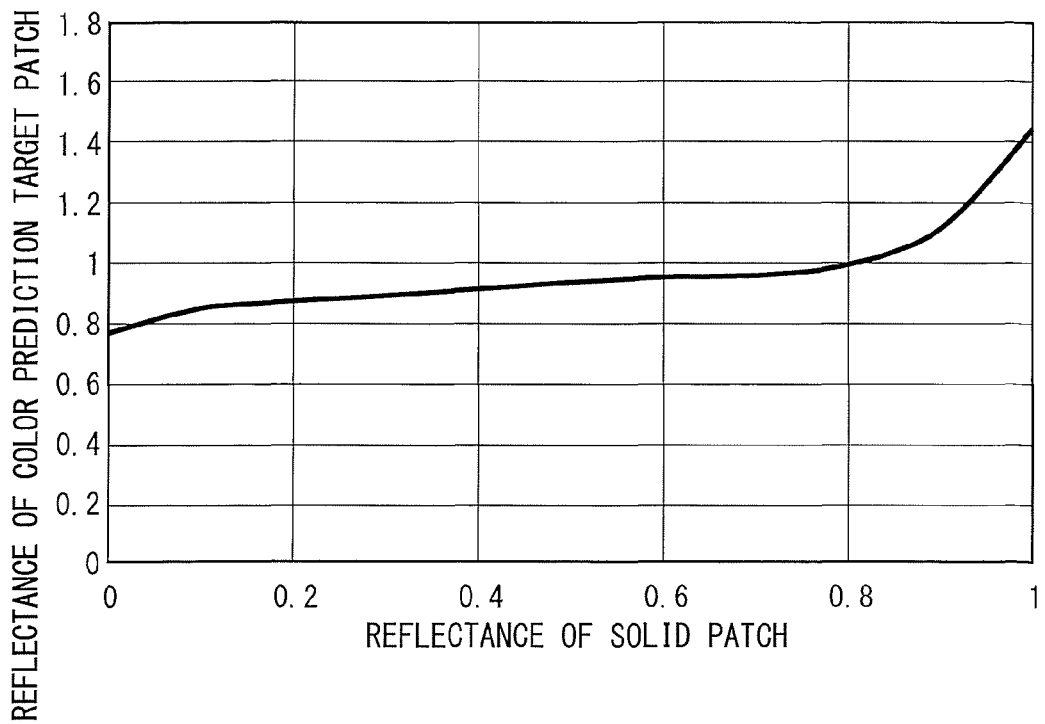
FIG. 21 is a diagram for describing necessity of selecting a similar color from among candidate colors regarding the embodiment.

Further, when colorimetry of the first type patches 71 in the CxF chart was performed focusing on a certain color close to green, a relational graph as shown in FIG. 20 was obtained on the basis of the colorimetric result of the solid patch PA2 and the colorimetric result of a certain color prediction target patch. When a relational equation was obtained based on this relational graph, a curve as indicated by a thick solid line in FIG. 21 was obtained as a curve representing the relational equation. The numerical range of the spectral reflectances of the solid patch PA from which the relational equation is calculated is from 0.02 to 0.77. It can be seen from the curve shown in FIG. 21 that, when the reflectance of the solid patch for the prediction target color exceeds 0.8, an inappropriate prediction result is obtained.

As above, depending on the numerical range of the spectral reflectances of the solid patch PA2 for the sample color selected as a similar color, the spectral reflectances may not be predicted with high accuracy. Specifically, the reflectances of the color prediction target patch are not accurately predicted for data outside the numerical range of the spectral reflectances of the solid patch PA2 for the sample color among the spectral reflectance data of the solid patch PA2 for the prediction target color. Therefore, there is a possibility that the color is not accurately predicted unless a suitable sample color is selected as the similar color in the step S110.

In view of the above, the configuration may be such that a similar color is selected from among a plurality of candidate colors determined from a plurality of sample colors in accordance with a predetermined rule in the step S110 so that a relational equation by which the spectral reflectances of the color prediction target patch for the prediction target color can be accurately predicted can be obtained by the process in the step S120. Although the specific method for the process described above is not particularly limited, the following two methods can be considered, for example.

<3.5.1 First Method>

In the first method, a plurality of sample colors each having spectral reflectances that include a numerical range of the spectral reflectances of the prediction target color (the spectral reflectances of the solid patch for the prediction target color) are determined as candidate colors from among all the prepared sample colors. In other words, a plurality of sample colors are determined as candidate colors so that the numerical range of the spectral reflectances of the solid patch for the sample color to be determined as the candidate color includes the numerical range of the spectral reflectances of the solid patch for the prediction target color. For example, in a case in which the numerical range of the spectral reflectances of the prediction target color is from 0.02 to 0.60, sample colors in which the minimum value of the spectral reflectance of the solid patch PA2 is 0.02 or less and the maximum value of the spectral reflectance of the solid patch PA2 is 0.60 or more are determined as candidate colors. Then, a sample color from which the least square error is obtained is selected, as the similar color, from among the sample colors determined as the candidate colors.

<3.5.2 Second Method>

In the second method, k sample colors (k is an integer of 2 or more) from a sample color having the widest numerical range of the spectral reflectances (spectral reflectances of the solid patch PA2) to a sample color having the kth widest numerical range thereof are determined as candidate colors from among all of the prepared sample colors. For example, in a case in which 100 sample colors are prepared, 32 sample colors from a sample color having the widest numerical range of the spectral reflectances of the solid patch PA2 to a sample color having the 32nd widest numerical range are determined as candidate colors. Then, a sample color from which the least square error is obtained is selected, as the similar color, from among the 32 sample colors determined as the candidate colors.

<4. Effects>

According to the present embodiment, a color close to the prediction target color is selected as a similar color from among a plurality of sample colors that have been subjected to colorimetry of the CxF chart, and a relational equation (approximate equation) representing the relationship between the spectral reflectances of the solid patch PA2 and the spectral reflectances of the color prediction target patch is obtained for the selected similar color. Then, spectral reflectances (predicted values) of the color prediction target patch for the prediction target color are obtained by applying the spectral reflectances of the solid patch PA2 for the prediction target color to the relational equation. Since the spectral reflectances are predicted on the basis of the "relationship between the spectral reflectances of the solid patch PA2 and the spectral reflectances of the color prediction target patch" for a color close to the prediction target color as described above, accurate predicted values can be obtained. That is, without printing a CxF chart using an ink of the prediction target color, the spectral reflectances of each patch when the CxF chart is assumed to be printed can be obtained with high accuracy. Therefore, printing of CxF charts and colorimetry thereof are not necessary. As above, it is possible to highly accurately predict a color of a patch to be included in the CxF chart so that a color obtained by overprinting inks of a plurality of colors can be predicted at lower cost and with fewer man-hours than ever before.

<5. Modifications>

Hereinafter, modifications of the embodiment will be described.

<5.1 Selection of Similar Color>

<5.1.1 First Modification>

An example of selecting a similar color by a method using machine learning will be described below as a first modification. In the present modification, a similar color determination model is constructed for determining to which sample color the prediction target color is similar in a situation where a plurality of sample colors are prepared in advance. The similar color determination model is implemented by a neural network 60 that performs machine learning (see FIG.

22). The process using the neural network 60 is roughly classified into a learning stage process and a classification stage process. In the learning stage, teaching data (training data) is given to the neural network 60, and machine learning using the teaching data is performed in the neural network 60. The neural network 60 is given, as the teaching data, the spectral reflectances of the solid patch PA2 for the sample color and a value equivalent to a classification number for distinguishing a plurality of sample colors from each other. In the classification stage, the spectral reflectances of the solid patch PA2 for the prediction target color are given to the learned neural network 60. As a result, the probability for each classification number is outputted from the neural network 60. Then, a sample color corresponding to a classification number with the highest probability is selected as the similar color.

Figure 22:
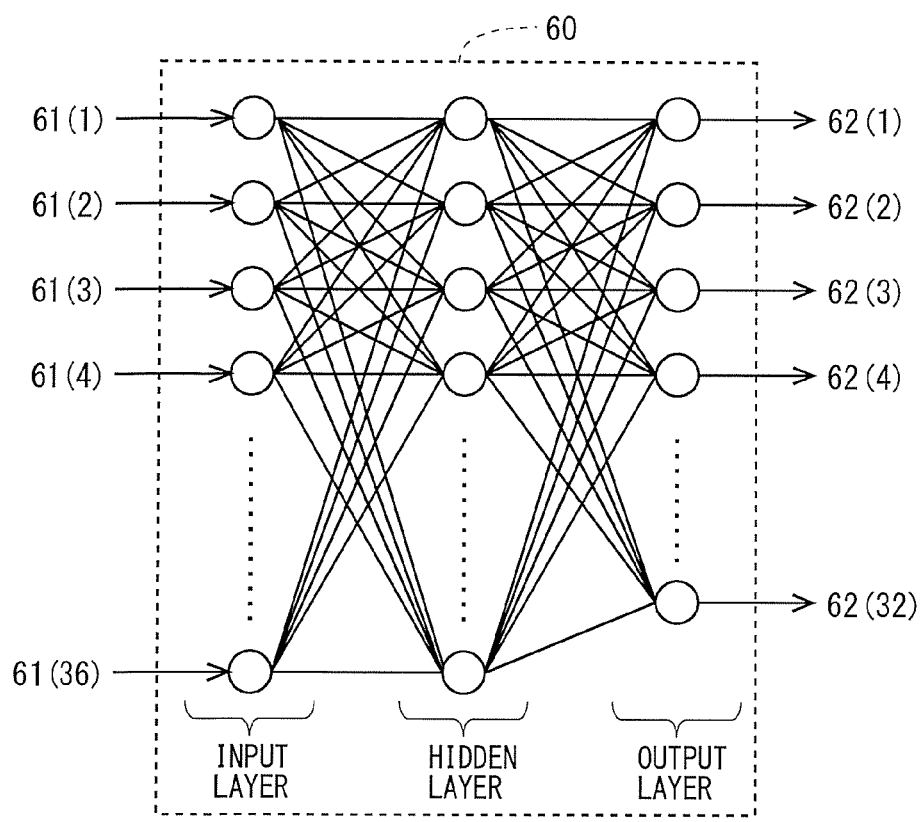
FIG. 22 is a diagram showing an example of the structure of a neural network used in a first modification of the embodiment.

FIG. 22 is a diagram showing an example of the structure of the neural network 60 used in the present modification. Here, it is assumed that 32 sample colors are prepared. The neural network 60 includes an input layer, a hidden layer (intermediate layer), and an output layer. The input layer is composed of 36 units (neurons) that receive 36 spectral reflectances 61(1) to 61(36). The hidden layer is also composed of 36 units. Note that the number of units in the hidden layer is not limited to 36. Although the number of hidden layers is 1 in the example shown in FIG. 22, the number of hidden layers may be 2 or more. The output layer is composed of 32 units that output 32 pieces of probability data (the same number of probability data as the number of prepared sample colors) 62(1) to 62(32) representing the probability that the input data should be classified into each sample color.

The input layer and the hidden layer are fully connected, and the hidden layer and the output layer are also fully connected. A sigmoid function is adopted as the activation function for the hidden layer, and a softmax function is adopted as the activation function for the output layer. However, a function other than the sigmoid function can be employed as the activation function for the hidden layer.

Figure 23:
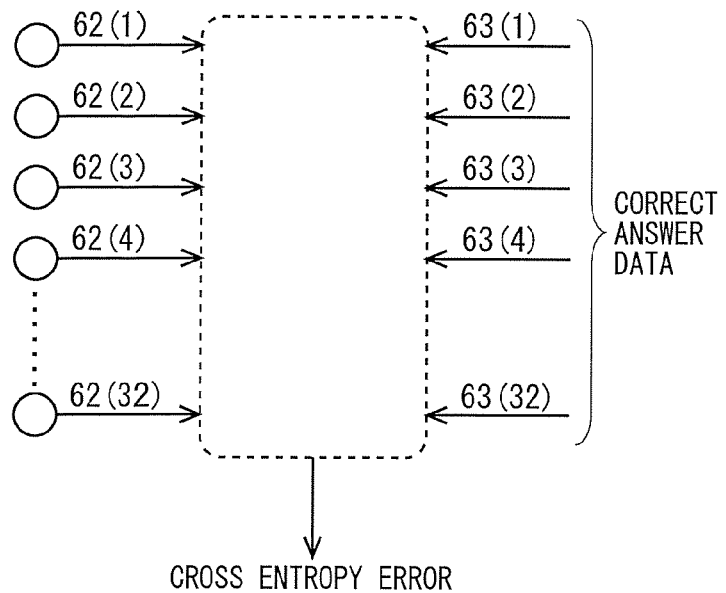
FIG. 23 is a diagram for describing a process during learning using the neural network in the first modification of the embodiment.
Figure 24:
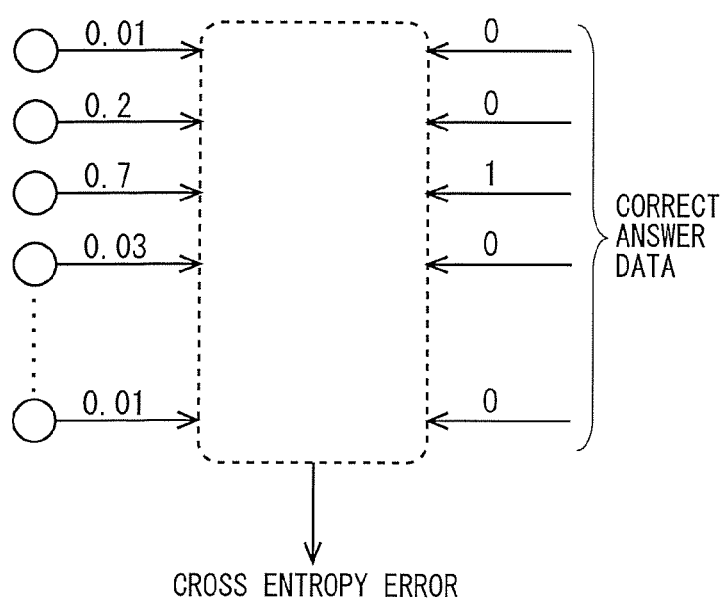
FIG. 24 is a diagram for describing a process during learning using the neural network in the first modification of the embodiment.

When performing learning using this neural network 60, spectral reflectances 61(1) to 61(36) are given to the input layer. As a result, forward propagation processing is performed in the neural network 60, and a cross entropy error is obtained on the basis of the probability data 62(1) to 62(32) outputted from the output layer and correct answer data 63(1) to 63(32), for example (see FIG. 23). As an example, a cross entropy error is obtained based on probability data and correct answer data as shown in FIG. 24. As shown in FIG. 24, the probability data 62(1) to 62(32) outputted from the output layer are not less than 0 and not more than 1. Also, as shown in FIG. 24, the correct answer data 63(1) to 63(32) are 1 or 0. For example, in a case in which learning is performed using sample color data to which "classification number: 3" is assigned, only correct answer data 63(3) is 1, and correct answer data pieces 63(1) to 63(2) and 63(4) to 63(32) are 0. The cross entropy error is obtained in the above-described manner, and the parameters (weighting coefficients, biases) of the neural network 60 are updated so that the cross entropy error becomes as small as possible. The above parameters are optimized by repeating the learning as described above. It should be noted that, as a learning method, batch learning may be used in which all pieces of teaching data are given to the neural network 60 in a collective manner, mini-batch learning may be used in which teaching data is divided into a plurality of groups, and the teaching data is given to the neural network 60 for each group, or online learning may be used in which teaching data is given to the neural network 60 one by one.

When performing classification using the neural network 60, the spectral reflectances 61(1) to 61(36) of the solid patch PA2 for the prediction target color are given to the input layer. Then, by performing forward propagation processing in the neural network 60, the probability data 62(1) to 62(32) are outputted from the output layer. A sample color to which a classification number corresponding to the maximum value of the probability data 62(1) to 62(32) is assigned is selected as a similar color.

Figure 25:
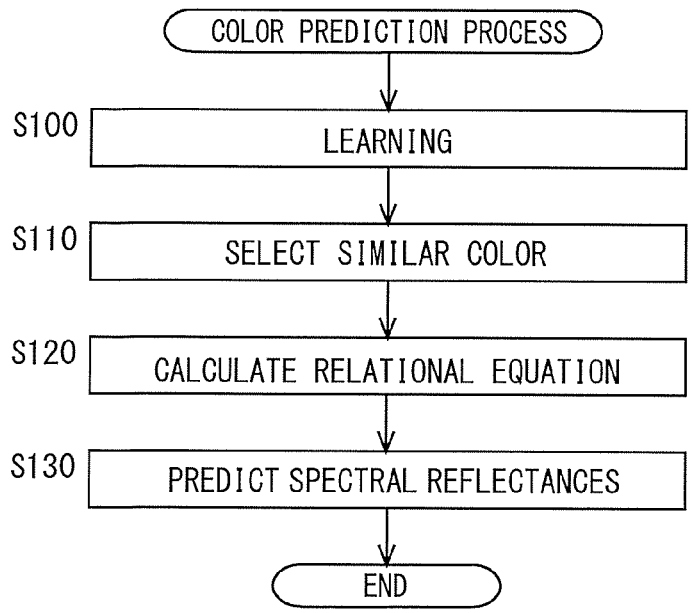
FIG. 25 is a flowchart showing a schematic procedure of a color prediction process in the first modification of the embodiment.

FIG. 25 is a flowchart showing a schematic procedure of a color prediction process in the present modification. First, machine learning by the neural network 60 is performed using, as teaching data, the colorimetric results of the prepared sample colors (step S100). Thus, a similar color determination model is constructed. Next, the probabilities that the prediction target color should be classified into respective sample colors are obtained by giving the spectral reflectances of the solid patch PA2 of the prediction target color as input data to the neural network 60 serving as the similar color determination model constructed in the step S100, and a sample color with the highest probability is selected as the similar color (step S110). The step S120 and the step S130 are the same as those in the above embodiment.

Here, it is assumed that one sample color is selected as a similar color. However, the configuration may be such that two or more sample colors are selected as similar colors and spectral reflectances (reflectances at respective wavelengths) are calculated as follows. For example, in the step S110, two sample colors having the highest probability and the second highest probability are selected as similar colors. In this case, it is assumed that the probability of the first sample color is 0.7 and the probability of the second sample color is 0.1. When the value (reflectance value) obtained using the relational equation for the first sample color is represented as R1, and the value obtained using the relational equation for the second sample color is represented as R2, the predicted value R is calculated by the following Equation (8).

$$R=R1\times(0.7/0.8)+R2\times(0.1/0.8) \quad (8)$$

In the present modification, the neural network 60 is directly given the spectral reflectance values as input data. However, the present invention is not limited thereto. The configuration may be such that measured values of spectral reflectances are subjected to normalization with the spectral reflectance of the paper white patch PA1 being 1 and the values obtained by normalization are given to the neural network 60 as input data. Thus, a sample color similar to the prediction target color is selected in consideration of the characteristics of the base material (printing paper) used for printing.

In addition, the configuration may be such that spectral reflectances of the paper white patch PA1 (that is, the spectral reflectances of the base material) as well as spectral reflectances of the solid patch PA2 are given to the neural network 60 as input data. Also in a case in which such configuration is employed, a sample color similar to the prediction target color is selected in consideration of the characteristics of the base material (printing paper) used for printing.

In the modification, an enormous amount of calculation processing may be performed for machine learning. Therefore, regarding the hardware configuration of the print data generation apparatus 100 (see FIG. 10), a GPU may be provided as a processor instead of the CPU 11, or the CPU 11 and the GPU may be provided as processors.

<5.1.2 Second Modification>

An example of selecting a similar color using a color difference will be described below as a second modification. In the present modification, the color difference between the prediction target color and each sample color is obtained in the step S110 in FIG. 11. Then, a sample color from which the least color difference is obtained is selected as a similar color.

It should be noted that the color difference between the prediction target color and a certain sample color is obtained as follows, for example. First, for the prediction target color and for each sample color, tristimulus values X, Y, and Z are obtained from the spectral reflectances of the solid patch PA2 using a predetermined calculation equation. Next, for the prediction target color and for each the sample color, Lab values ("L value", "a value", and "b value") are obtained from the tristimulus values X, Y, and Z by a predetermined conversion equation. Next, for each of "L value", "a value", and "b value", the difference between the prediction target color and the sample color is obtained. The value (positive value) of the square root of the sum of squares of the three differences obtained in this manner is the color difference.

<5.2 Regarding Relational Equation>

<5.2.1 Third Modification>

In the above embodiment, a quintic equation is employed as a relational equation (approximate equation) representing the relationship between the spectral reflectances of the solid patch PA2 and the spectral reflectances of the color prediction target patch. However, the degree of the relational equation is not limited to 5. An equation of the nth degree in which n is an integer of 2 or more may be adopted as a relational equation.

In this regard, relational equations having different degrees may be used for respective colors. For example, in regard to a color with a narrow numerical range of the spectral reflectances of the solid patch PA2, if the degree of the relational equation is large, overfitting may be caused and approximation accuracy may deteriorate. Therefore, in regard to such a color, the degree of the relational equation is lowered, by which it is possible to suppress the deterioration of the approximation accuracy due to overfitting.

<5.2.2 Fourth Modification>

Further, an equation represented by using a power function may be used as the relational equation (approximate equation) representing the relationship between the spectral reflectances of the solid patch PA2 and the spectral reflectances of the color prediction target patch. In this case, for example, the values of variables A and B in the following Equation (9) are obtained on the basis of the above-described combination data (data represented as a plot on the relational graph). Then an equation reflecting the values of the variables A and B is used as the relational equation. It should be noted that, in the following Equation (9), y is a reflectance of the color prediction target patch and x is a reflectance of the solid patch PA2.

$$y = Ax^B \quad (9)$$

<5.3 when Numerical Range of Spectral Reflectances of Solid Patch for Similar Color is Narrow>

When the relational graph as shown in FIG. 20 is obtained in regard to a similar color on the basis of the colorimetric result of the solid patch PA2 and the colorimetric result of a certain color prediction target patch, there is concern that the color prediction may not be performed with high accuracy as described above. In view of the above, the following measures may be taken as a fifth modification or a sixth modification.

<5.3.1 Fifth Modification>

Figure 26:
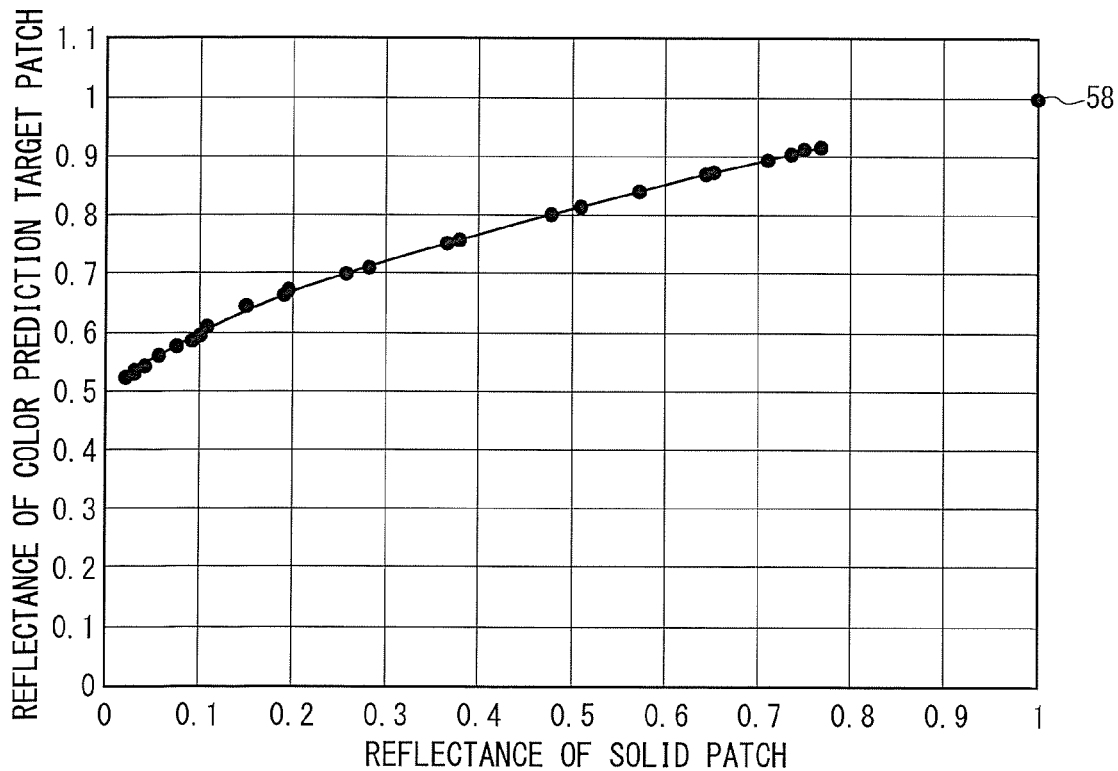
FIG. 26 is a diagram for describing addition of combination data for obtaining a relational equation in a fifth modification of the embodiment.

The relational graph as shown in FIG. 20 is obtained in the case where the spectral reflectance data of the solid patch PA2 for a similar color does not include data having a value not less than p and not more than 1 with P being a predetermined value less than 1 (for example, p is set as 0.8). In the present modification, in such a case, combination data corresponding to a plot denoted by reference numeral 58 in FIG. 26 is added prior to the calculation of the relational equation. That is, combination data indicating that the spectral reflectance of the color prediction target patch for the similar color is 1 when the spectral reflectance of the solid patch PA2 for the similar color is 1 is added. After the combination data is added in this way, a relational equation is obtained.

As described above, in the present modification, when the spectral reflectance data of the solid patch PA2 for the similar color does not include data having a value not less than p and not more than 1 with P being a predetermined value less than 1, the relational equation is obtained by adding combination data in which the spectral reflectance of the solid patch PA2 for the similar color is 1 and the spectral reflectance of the color prediction target patch for the similar color is 1, in the step S120 in FIG. 11. Using the relational equation thus obtained, the spectral reflectances are predicted in the step S130 in FIG. 11.

<5.3.2 Sixth Modification>

In the present modification, in a case in which the relational graph as shown in FIG. 20 is obtained, the relational equation is calculated in the same manner as in the above embodiment. Then, in the step S130 in FIG. 11, different process is performed depending on whether or not the reflectances (reflectances at respective wavelengths) of the solid patch PA2 for the prediction target color are included in the numerical range of the spectral reflectances of the solid patch PA2 for the similar color. This will be described with reference to FIG. 27. It is assumed that, in regard to the spectral reflectance data of the solid patch PA2 for the similar color, the maximum value is u that is not more than q that is a predetermined value less than 1 (for example, q is 0.8), and the spectral reflectance of the color prediction target patch corresponding to the maximum value is v.

Figure 27:
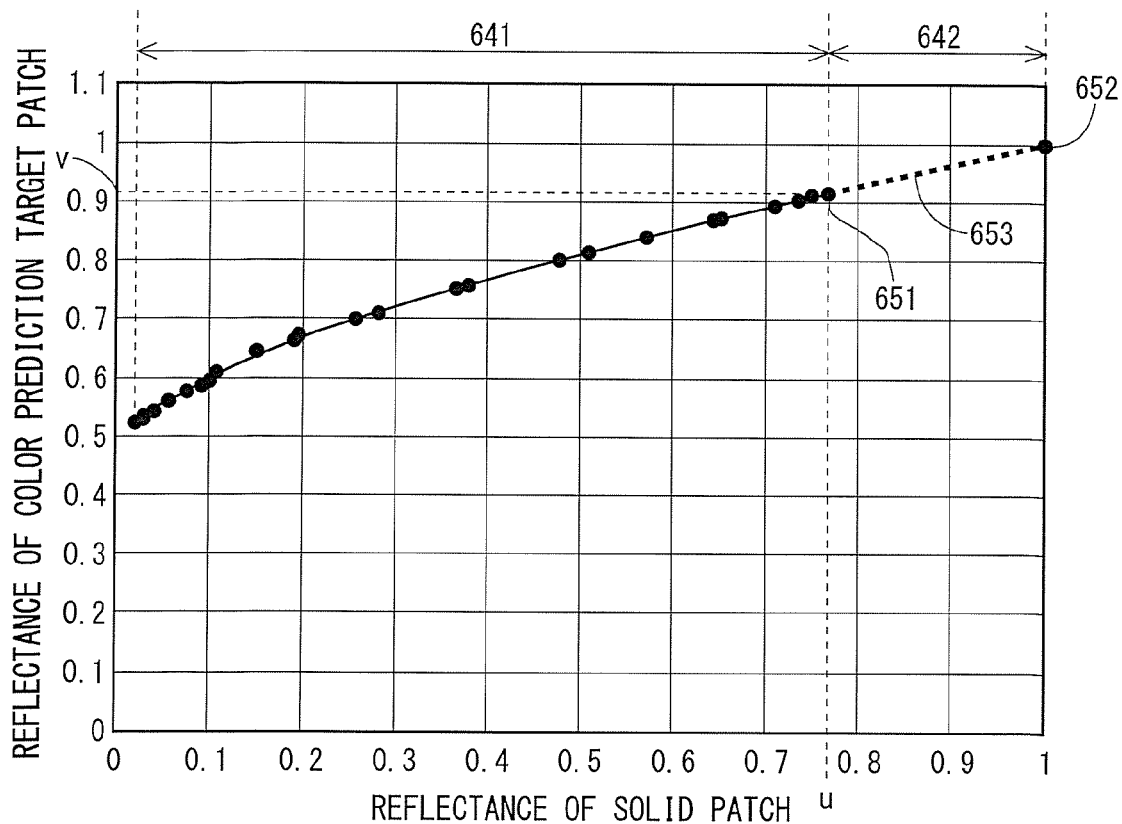
FIG. 27 is a diagram for describing how to obtain predicted values of spectral reflectances in a sixth modification of the embodiment.

When the reflectance of the solid patch PA2 at a certain wavelength for the prediction target color is within the range indicated by an arrow denoted by reference numeral 641 in FIG. 27 (that is, within the numerical range of the spectral reflectances of the solid patch PA2 for the similar color), the reflectance of the color prediction target patch at the corresponding wavelength for the prediction target color can be obtained using the relational equation as in the above embodiment. On the other hand, when the reflectance of the solid patch PA2 at a certain wavelength for the prediction target color is within the range indicated by an arrow denoted by reference numeral 642 in FIG. 27, the reflectance of the color prediction target patch at the corresponding wavelength for the prediction target color is obtained by performing linear interpolation using a straight line connecting the coordinates (reflectance of the solid patch PA2 is u and reflectance of the color prediction target patch is v) of the plot 651 and the coordinates (reflectance of the solid patch PA2 is 1 and reflectance of the color prediction target patch is 1) of the plot 652 (a straight line denoted by reference numeral 653). In other words, when the maximum value of the spectral reflectance data of the solid patch PA2 for the similar color is u which is not more than q that is a predetermined value less than 1, and the spectral reflectance of the color prediction target patch corresponding to the maximum value is v, the predicted value of the spectral reflectance of the color prediction target patch corresponding to data having a value larger than u among the spectral reflectance data of the solid patch PA2 for the prediction target color is obtained by performing linear interpolation on the basis of the spectral reflectances of the solid patch PA2 for the prediction target color, using the combination data (the combination data corresponding to the plot 651) in which a spectral reflectance of the solid patch PA2 for the similar color is u and a spectral reflectance of the color prediction target patch for the similar color is v, and the combination data (the combination data corresponding to the plot 652) in which a spectral reflectance of the solid patch PA2 for the similar color is 1 and a spectral reflectance of the color prediction target patch for the similar color is 1, in the step S130 in FIG. 11.

<5.4 Regarding Spectral Characteristics to be Used>
<5.4.1 Seventh Modification>

In the above embodiment, the color prediction process is performed using spectral reflectances. However, the present invention is not limited thereto, and the color prediction process may be performed using spectral characteristics other than spectral reflectances. Examples of spectral characteristics other than spectral reflectances include spectral absorption factors (values each obtained by subtracting the spectral reflectance from 1) and spectral absorption coefficients $\alpha$ each obtained from the following Equation (10). When the reflectance of paper white at a certain wavelength is $R_0$, the reflectance of the corresponding patch is R, and the thickness of the ink is x, the spectral absorption coefficient $\alpha$ is expressed by the following Equation (10) when multiple reflection is not considered.

$$\alpha = -(1/(2x)) \cdot \ln(R/R_0) \qquad (10)$$

<5.4.2 Eighth Modification>

In the above embodiment, color prediction is performed using a relational equation representing the relationship between the spectral reflectances of the solid patch PA2 and the spectral reflectances of the color prediction target patch. However, the relationship represented by the relational equation is not limited thereto. For example, color prediction may be performed using a relational equation representing the relationship between the spectral absorption factors of the solid patch PA2 and the spectral absorption factors of the color prediction target patch, or a relational equation representing the relationship between the spectral reflectances of the solid patch PA2 and the spectral absorption factors of the color prediction target patch.

<5.5 Regarding Overall Processing Procedure (Ninth Modification)>

Figure 28:
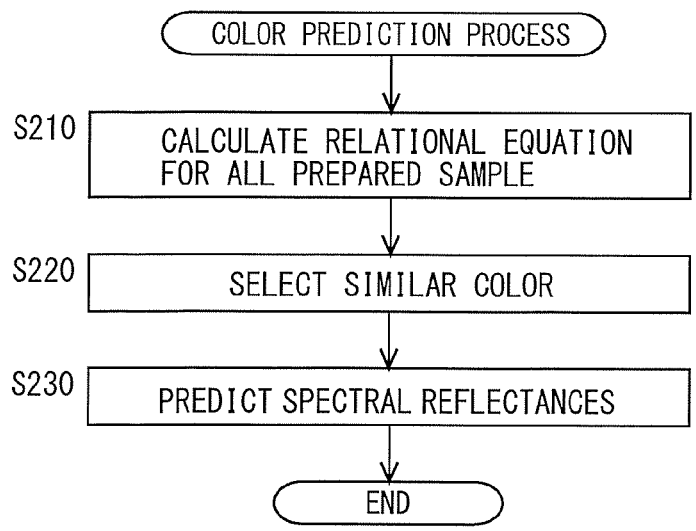
FIG. 28 is a flowchart showing a schematic procedure of a color prediction process in a ninth modification of the embodiment.

In the above embodiment, after a similar color is selected from among a plurality of sample colors, a relational equation is calculated for the sample color selected as the similar color (see FIG. 11). However, the present invention is not limited thereto. The configuration may be such that relational equations are calculated in advance for all of the prepared sample colors. Hereinafter, the schematic procedure of the color prediction process in the present modification will be described with reference to FIG. 28.

First, a relational equation representing the relationship between the spectral reflectances of the solid patch PA2 and the spectral reflectances of the color prediction target patch is obtained for all the prepared sample colors (step S210). The specific method for obtaining each relational equation is the same as that in the above embodiment. Since there are nine color prediction target patches as described above, nine relational equations are obtained for each sample color by the process in the step S210.

Next, a color close to the prediction target color is selected as a similar color from among a plurality of sample colors on the basis of the spectral reflectance data that has already been obtained (step S220). The specific method for selecting the similar color is the same as that in the above embodiment.

Finally, predicted values of the spectral reflectances of the color prediction target patch for the prediction target color are obtained by applying the spectral reflectances of the solid patch PA2 for the prediction target color to the relational equation for the sample color selected, as the similar color, in the step S210 (step S230). Thus, the predicted values of the spectral reflectances of each of the nine color prediction target patches are obtained for the prediction target color as in the above embodiment.

In the above-described manner, even if the CxF chart is not actually printed using the ink of the prediction target color, the spectral reflectances of all the first type patches 71 when the CxF chart is assumed to be printed are obtained.

Meanwhile, the process in the step S210 needs to be performed only once, and does not need to be performed for each process for one prediction target color. On the other hand, the processes in the step S220 and the step S230 need to be performed for each process for one prediction target color. In other words, the processing load when color prediction is actually performed is reduced by obtaining in advance the relational equations for all the sample colors in the step S210.

<5.6 Method not Using Relational Equation (Tenth Modification)>

In the above embodiment, a relational equation (approximate equation) representing the relationship between the spectral reflectances of the solid patch PA2 and the spectral reflectances of the color prediction target patch is used to perform color prediction. However, it is also possible to perform color prediction without using such a relational equation. Hereinafter, a method in which the relational equation is not used will be described.

Figure 29:
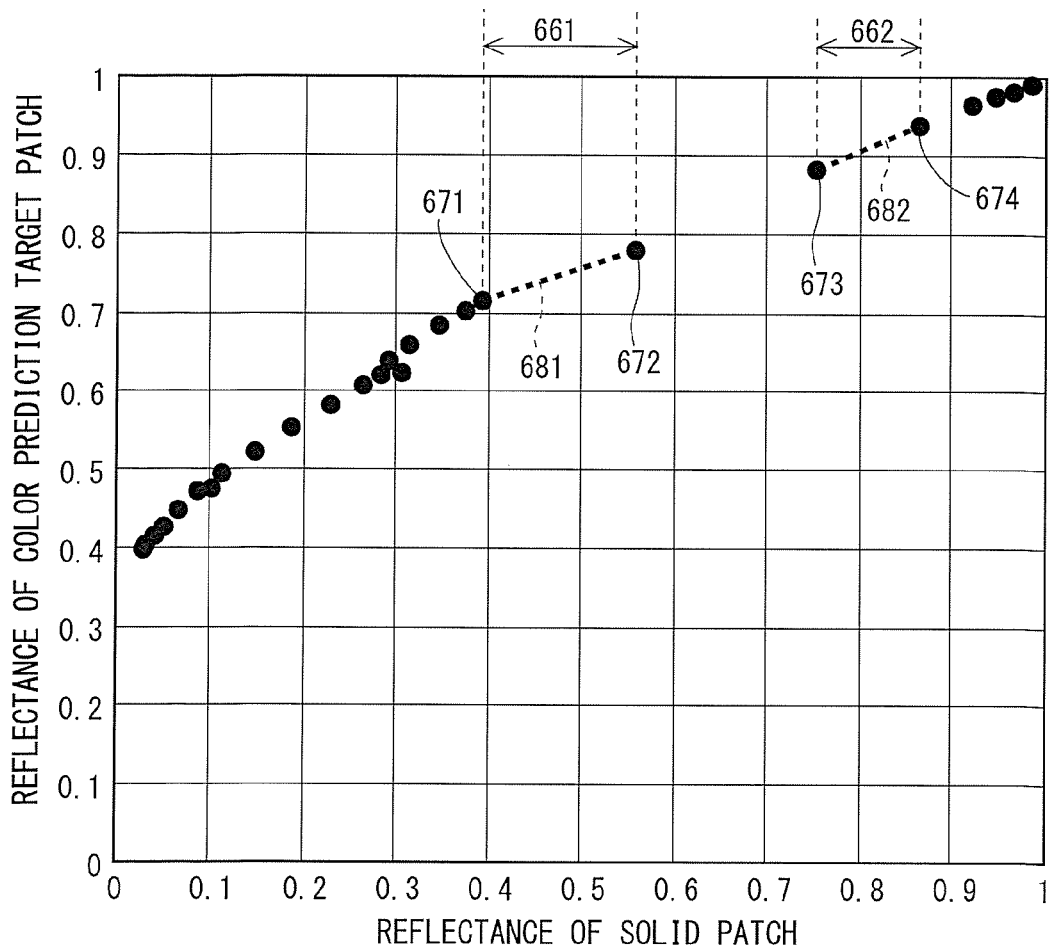
FIG. 29 is a diagram for describing linear interpolation performed in a tenth modification of the embodiment.

Regarding the similar color, it is assumed that a relational graph as shown in FIG. 29 is obtained on the basis of the spectral reflectances of the solid patch PA2 and the spectral reflectances of a certain color prediction target patch. In this case, for example, when the reflectance of the solid patch PA2 at a certain wavelength for the prediction target color is within the range indicated by an arrow denoted by reference numeral 661 in FIG. 29, the reflectance of the color prediction target patch at the corresponding wavelength for the prediction target color can be obtained by linear interpolation using a straight line connecting the coordinates of a plot 671 and the coordinates of a plot 672 (a straight line denoted by reference numeral 681). Further, for example, when the reflectance of the solid patch PA2 at a certain wavelength for the prediction target color is within the range indicated by an arrow denoted by reference numeral 662 in FIG. 29, the reflectance of the color prediction target patch at the corresponding wavelength for the prediction target color can be obtained by linear interpolation using a straight line connecting the coordinates of a plot 673 and the coordinates of a plot 674 (a straight line denoted by reference numeral 682). In this manner, in the present modification, the reflectance of the color prediction target patch at each wavelength for the prediction target color is obtained by performing linear interpolation using the relationship between the spectral characteristics of the solid patch PA2 for the similar color and the spectral characteristics of the color prediction target patch for the similar color.

Figure 30:
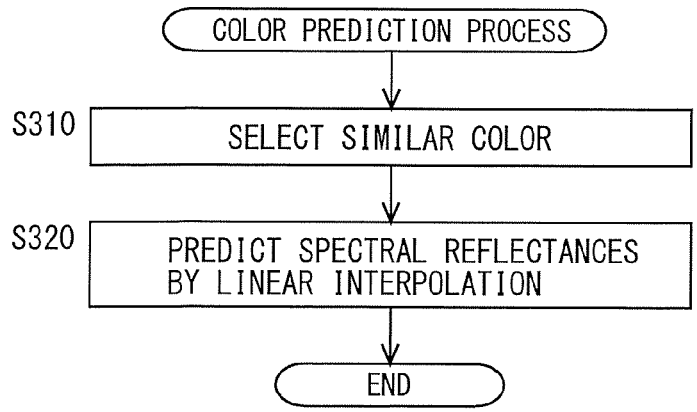
FIG. 30 is a flowchart showing a schematic procedure of a color prediction process in the tenth modification of the embodiment.
Figure 31:
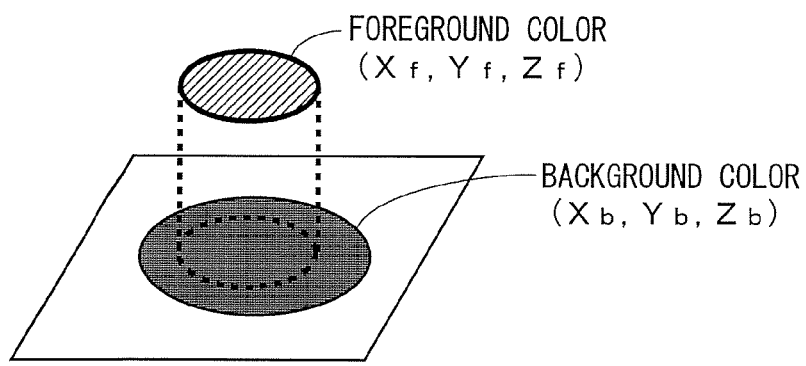
FIG. 31 is a diagram for describing a Deshpande et al. method in relation to a conventional example.
Figure 32:
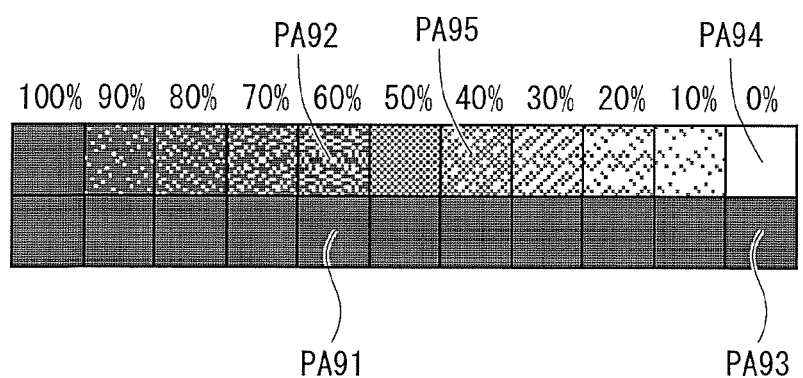
FIG. 32 is a diagram schematically showing an example of a CxF chart in relation to the conventional example.
Figure 33:
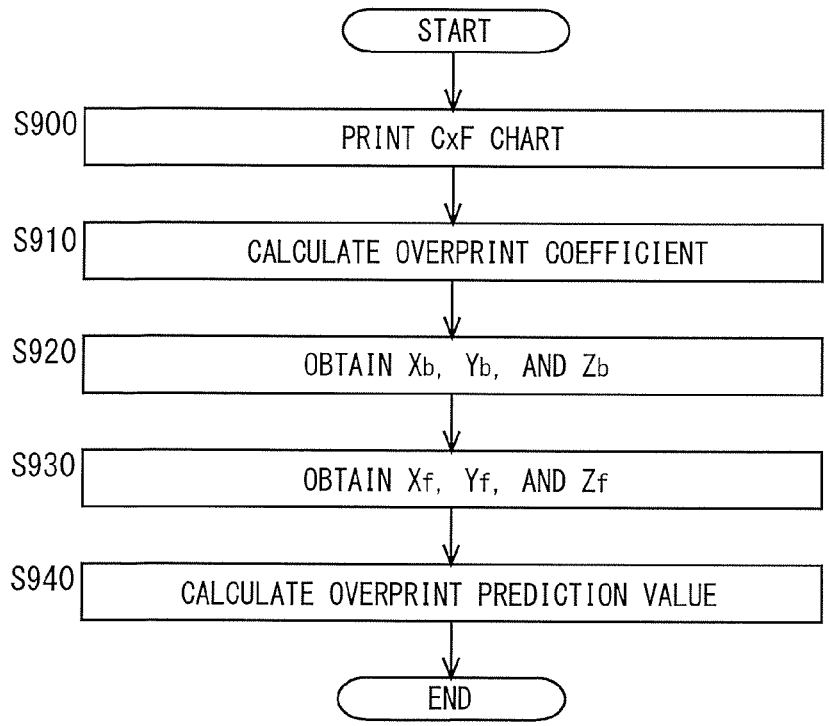
FIG. 33 is a flowchart for describing the Deshpande et al. method in relation to the conventional example.
Figure 34:
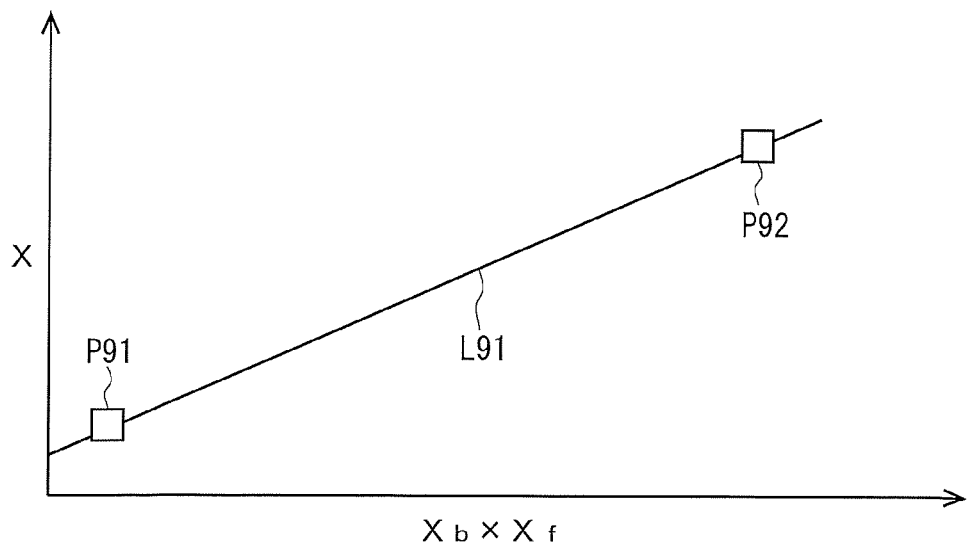
FIG. 34 is a diagram for describing the Deshpande et al. method in relation to the conventional example.
Figure 35:
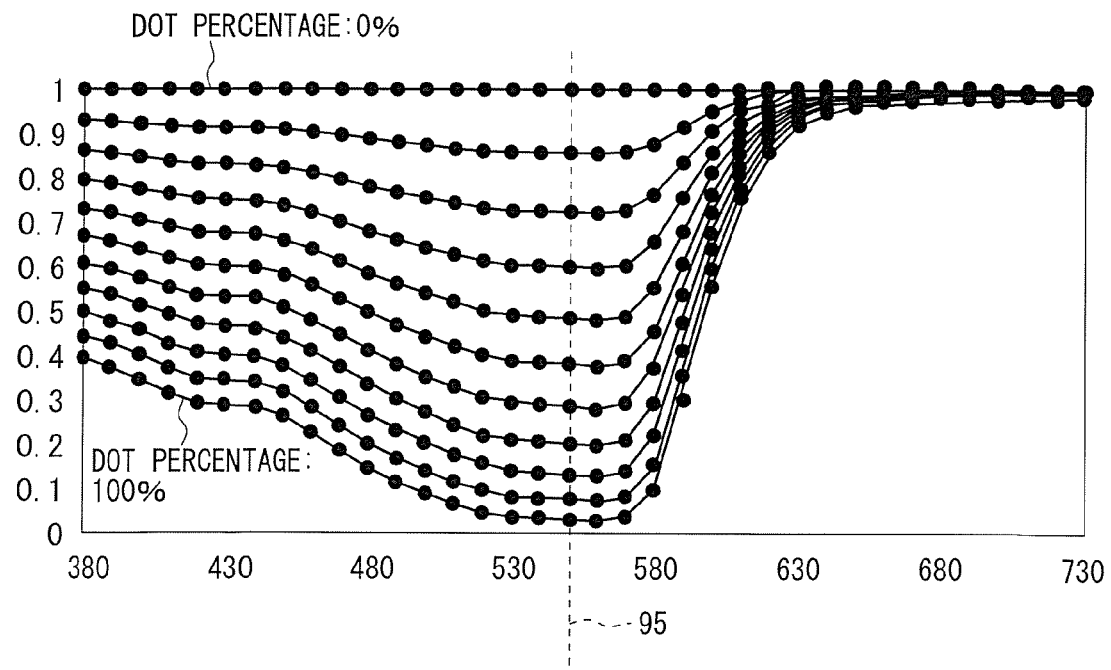
FIG. 35 is a graph showing the spectral reflectances obtained using the Yule-Nielsen model in relation to the conventional example.
Figure 36:
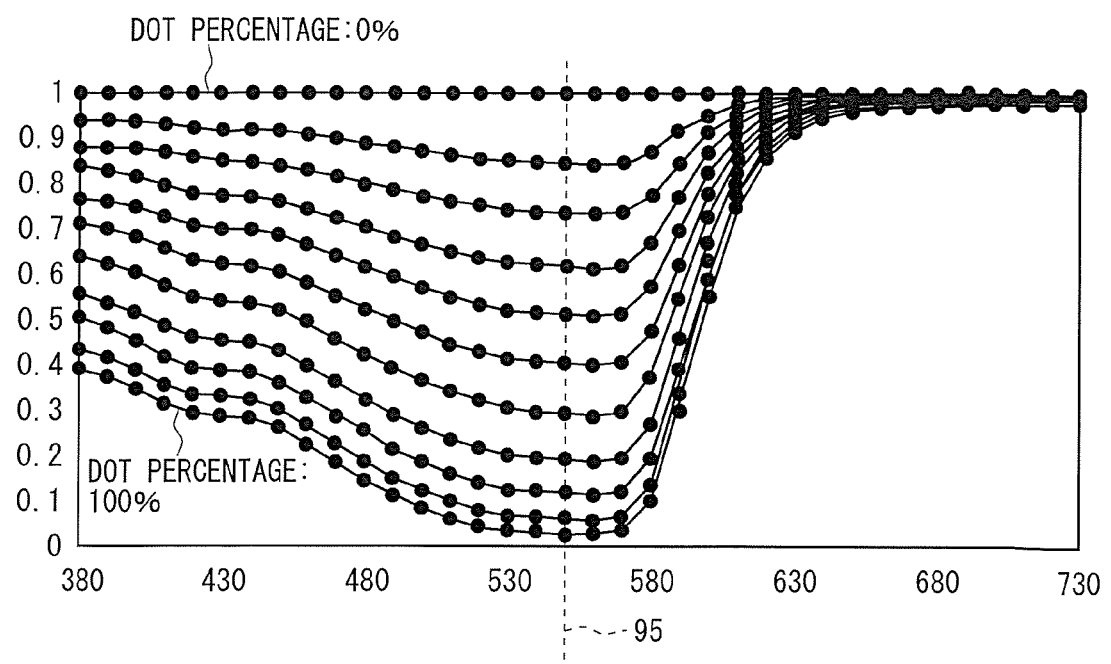
FIG. 36 is a graph showing the actual spectral reflectances in relation to the conventional example.

FIG. 30 is a flowchart showing a schematic procedure of the color prediction process in the present modification. First, a color close to the prediction target color is selected as a similar color from among a plurality of sample colors on the basis of the spectral reflectance data obtained before performing this color prediction process as in the above embodiment (step S310). Next, linear interpolation is performed on the basis of the spectral characteristics of the solid patch PA2 for the prediction target color using the relationship between the spectral reflectances of the solid patch PA2 and the spectral reflectances of the color prediction target patch for the similar color, whereby the predicted values of the spectral characteristics of the color prediction target patch for the prediction target color are obtained (step S320).

<6. Notes>

From the above disclosure, the configurations described below can be considered.

(Note 1)

A color prediction method for predicting a color of each of a plurality of patches corresponding to ink densities of a plurality of levels when a color chart including the plurality of patches is made by applying an ink of a prediction target color on a base material with ink densities of the plurality of levels, the color prediction method comprising:

a similar color selection step of selecting, as a similar color, a color close to the prediction target color from among a plurality of sample colors for which spectral characteristics of the plurality of patches are obtained;

a relational equation calculation step of obtaining, for the similar color, a relational equation representing a relationship between spectral characteristics of a reference patch and spectral characteristics of a color prediction target patch that is a patch other than the reference patch, the reference patch being a patch having a maximum ink density from among the plurality of patches; and a spectral characteristic prediction step of obtaining predicted values of spectral characteristics of the color prediction target patch for the prediction target color by applying spectral characteristics of the reference patch for the prediction target color to the relational equation.

(Note 2)

The color prediction method according to Note 1, wherein, in the similar color selection step, the similar color is selected from among a plurality of candidate colors determined from the plurality of sample colors in accordance with a predetermined rule.

(Note 3)

The color prediction method according to Note 2, wherein a numerical range of spectral characteristics of the reference patch for each sample color that is determined as one of the plurality of candidate colors includes a numerical range of the spectral characteristics of the reference patch for the prediction target color.

(Note 4)

The color prediction method according to Note 2, wherein k (k is an integer of 2 or more) sample colors from a sample color having the widest numerical range of the spectral characteristics of the reference patch to a sample color having the kth widest numerical range thereof among the plurality of sample colors are determined as the plurality of candidate colors.

(Note 5)

The color prediction method according to any one of Note 1 to Note 4, wherein, in the similar color selection step, a square error between the spectral characteristics of the reference patch for the prediction target color and spectral characteristics of the reference patch for each of the plurality of sample colors is obtained, and a sample color from which the least square error is obtained is selected as the similar color.

(Note 6)

The color prediction method according to any one of Note 1 to Note 4, further comprising a learning step of performing machine learning by a neural network that takes the spectral characteristics of the reference patch as input data and takes respective probabilities of a plurality of classification numbers corresponding to the plurality of sample colors as output data, using a plurality of pieces of teaching data including the spectral characteristics of the reference patch for each sample color and a value equivalent to a classification number corresponding to the sample color, wherein, in the similar color selection step, a sample color corresponding to a classification number having the highest probability from among probabilities of the plurality of classification numbers is selected as the similar color, the probabilities of the plurality of classification numbers being obtained as the output data by giving, as the input data, the spectral characteristics of the reference patch for the prediction target color to a learned neural network obtained in the learning step.

(Note 7)

The color prediction method according to Note 6, wherein data of spectral characteristics given to the neural network as the input data is normalized based on spectral characteristics of the base material.

(Note 8)

The color prediction method according to Note 6, wherein the neural network is given spectral characteristics of the base material as the input data, in addition to the spectral characteristics of the reference patch.

(Note 9)

The color prediction method according to any one of Note 1 to Note 4, wherein, in the similar color selection step, a color difference between the prediction target color and each sample color is obtained based on the spectral characteristics of the reference patch for the prediction target color and the spectral characteristics of the reference patch for a corresponding sample color, and a sample color from which the least color difference is obtained is selected as the similar color.

(Note 10)

The color prediction method according to any one of Note 1 to Note 9, wherein, in the relational equation calculation step, an equation for calculating an approximate value of the spectral characteristics of the color prediction target patch from the spectral characteristics of the reference patch is obtained as the relational equation based on a plurality of pieces of combination data obtained for each unit wavelength range, each of the plurality of pieces of combination data being obtained by combining a spectral characteristic of the reference patch for the similar color and a spectral characteristic of the color prediction target patch for the similar color.

(Note 11)

The color prediction method according to Note 10, wherein the relational equation is an equation of the nth degree in which n is an integer of 2 or more.

(Note 12)

The color prediction method according to Note 10, wherein the relational equation is represented by using a power function.

(Note 13)

The color prediction method according to any one of Note 10 to Note 12, wherein the spectral characteristics are spectral reflectances, and when data of the spectral reflectances of the reference patch for the similar color does not include data having a value not less than p and not more than 1 with p being a predetermined value less than 1, the relational equation is obtained by adding combination data in which a spectral reflectance of the reference patch for the similar color is 1 and a spectral reflectance of the color prediction target patch for the similar color is 1 in the relational equation calculation step.

(Note 14)

The color prediction method according to any one of Note 1 to Note 12, wherein the spectral characteristics are spectral reflectances, and when a maximum value of data of the spectral reflectances of the reference patch for the similar color is u which is not more than q that is a predetermined value less than 1, and a spectral reflectance of the color prediction target patch corresponding to the maximum value is v, a predicted value of a spectral reflectance of the color prediction target patch corresponding to data having a value larger than u among data of the spectral reflectances of the reference patch for the prediction target color is obtained by performing linear interpolation based on the spectral reflectances of the reference patch for the prediction target color, using combination data in which a spectral reflectance of the reference patch for the similar color is u and a spectral reflectance of the color prediction target patch for the similar color is v, and combination data in which a spectral reflectance of the reference patch for the similar color is 1 and a spectral reflectance of the color prediction target patch for the similar color is 1, in the spectral characteristic prediction step.

(Note 15)

The color prediction method according to any one of Note 1 to Note 14, wherein the spectral characteristics includes spectral reflectances, the number of the spectral reflectances being obtained by dividing a wavelength range including a range from 400 nm to 700 nm by a unit wavelength range of an appropriate size.

(Note 16)

The color prediction method according to any one of Note 1 to Note 12, wherein the spectral characteristics are any one of spectral reflectances, spectral absorption factors, and spectral absorption coefficients.

(Note 17)

A color prediction method for predicting a color of each of a plurality of patches corresponding to ink densities of a plurality of levels when a color chart including the plurality of patches is made by applying an ink of a prediction target color on a base material with ink densities of the plurality of levels, the color prediction method comprising:

a relational equation calculation step of obtaining, for a plurality of sample colors for which spectral characteristics of the plurality of patches are obtained, a relational equation representing a relationship between spectral characteristics of a reference patch and spectral characteristics of a color prediction target patch that is a patch other than the reference patch, the reference patch being a patch having a maximum ink density from among the plurality of patches;

a similar color selection step of selecting, as a similar color, a color close to the prediction target color from among the plurality of sample colors; and a spectral characteristic prediction step of obtaining predicted values of spectral characteristics of the color prediction target patch for the prediction target color by applying spectral characteristics of the reference patch for the prediction target color to the relational equation for the sample color selected as the similar color in the similar color selection step.

(Note 18)

A color prediction method for predicting a color of each of a plurality of patches corresponding to ink densities of a plurality of levels when a color chart including the plurality of patches is made by applying an ink of a prediction target color on a base material with ink densities of the plurality of levels, the color prediction method comprising:

a similar color selection step of selecting, as a similar color, a color close to the prediction target color from among a plurality of sample colors for which spectral characteristics of the plurality of patches are obtained; and a spectral characteristic prediction step of obtaining predicted values of spectral characteristics of the color prediction target patch for the prediction target color by performing linear interpolation based on spectral characteristics of a reference patch for the prediction target color using a relationship between spectral characteristics of the reference patch for the similar color and spectral characteristics of a color prediction target patch that is a patch other than the reference patch for the similar color, the reference patch being a patch having a maximum ink density from among the plurality of patches.

(Note 19)

A computer-readable recording medium having recorded therein a color prediction program for predicting a color of each of a plurality of patches corresponding to ink densities of a plurality of levels when a color chart including the plurality of patches is made by applying an ink of a prediction target color on a base material with ink densities of the plurality of levels, the color prediction program causing a computer to execute:

a similar color selection step of selecting, as a similar color, a color close to the prediction target color from among a plurality of sample colors for which spectral characteristics of the plurality of patches are obtained;

a relational equation calculation step of obtaining, for the similar color, a relational equation representing a relationship between spectral characteristics of a reference patch and spectral characteristics of a color prediction target patch that is a patch other than the reference patch, the reference patch being a patch having a maximum ink density from among the plurality of patches; and a spectral characteristic prediction step of obtaining predicted values of spectral characteristics of the color prediction target patch for the prediction target color by applying spectral characteristics of the reference patch for the prediction target color to the relational equation.

(Note 20)

A computer-readable recording medium having recorded therein a color prediction program for predicting a color of each of a plurality of patches corresponding to ink densities of a plurality of levels when a color chart including the plurality of patches is made by applying an ink of a prediction target color on a base material with ink densities of the plurality of levels, the color prediction program causing a computer to execute:

a relational equation calculation step of obtaining, for a plurality of sample colors for which spectral characteristics of the plurality of patches are obtained, a relational equation representing a relationship between spectral characteristics of a reference patch and spectral characteristics of a color prediction target patch that is a patch other than the reference patch, the reference patch being a patch having a maximum ink density from among the plurality of patches;

a similar color selection step of selecting, as a similar color, a color close to the prediction target color from among the plurality of sample colors; and a spectral characteristic prediction step of obtaining predicted values of spectral characteristics of the color prediction target patch for the prediction target color by applying spectral characteristics of the reference patch for the prediction target color to the relational equation for the sample color selected as the similar color in the similar color selection step.

<7. Others>

The present invention is not limited to the above-described embodiments (including modifications), and various modifications can be made without departing from the spirit of the present invention. Moreover, the present invention can also be embodied by appropriately combining the above embodiment and modifications so that there is no inconsistency.

This application is an application claiming priority based on Japanese Patent Application No. 2019-058380 entitled "Color Prediction Method and Color Prediction Program" filed on Mar. 26, 2019, and the contents of which are herein incorporated by reference.

What is claimed is:

1. A color prediction method for predicting spectral characteristics of each of a plurality of patches corresponding to ink densities of a plurality of levels when a color chart including the plurality of patches is made by applying an ink of a prediction target color on a base material with ink densities of the plurality of levels, the color prediction method comprising:

selecting, as a similar color, a color close to the prediction target color from among a plurality of sample colors for which spectral characteristics of the plurality of patches are obtained;

obtaining, for the similar color, a relational equation representing a relationship between spectral characteristics of a reference patch and spectral characteristics of a color prediction target patch that is a patch other than the reference patch, the reference patch being a patch having a maximum ink density from among the plurality of patches; and obtaining predicted values of spectral characteristics of the color prediction target patch for the prediction target color by applying spectral characteristics of the reference patch for the prediction target color to the relational equation.

2. The color prediction method according to claim 1, wherein the selecting of the similar color includes selecting the similar color from among a plurality of candidate colors determined from the plurality of sample colors in accordance with a predetermined rule.

3. The color prediction method according to claim 2, wherein a numerical range of spectral characteristics of the reference patch for each sample color that is determined as one of the plurality of candidate colors includes a numerical range of the spectral characteristics of the reference patch for the prediction target color.

4. The color prediction method according to claim 2, wherein k (k is an integer of 2 or more) sample colors from a sample color having the widest numerical range of the spectral characteristics of the reference patch to a sample color having the kth widest numerical range thereof among the plurality of sample colors are determined as the plurality of candidate colors.

5. The color prediction method according to claim 1, wherein the selecting of the similar color includes obtaining a square error between the spectral characteristics of the reference patch for the prediction target color and spectral characteristics of the reference patch for each of the plurality of sample colors, and selecting as the similar color a sample color from which the least the square error is obtained.

6. The color prediction method according to claim 1, further comprising performing machine learning by a neural network that takes the spectral characteristics of the reference patch as input data and takes respective probabilities of a plurality of classification numbers corresponding to the plurality of sample colors as output data, using a plurality of pieces of teaching data including the spectral characteristics of the reference patch for each sample color and a value equivalent to a classification number corresponding to the sample color, wherein the selecting of the similar color includes selecting as the similar color a sample color corresponding to a classification number having the highest probability from among probabilities of the plurality of classification numbers, the probabilities of the plurality of classification numbers being obtained as the output data by giving, as the input data, the spectral characteristics of the reference patch for the prediction target color to a learned neural network obtained by performing the machine learning.

7. The color prediction method according to claim 6, wherein data of spectral characteristics given to the neural network as the input data is normalized based on spectral characteristics of the base material.

8. The color prediction method according to claim 6, wherein the neural network is given spectral characteristics of the base material as the input data, in addition to the spectral characteristics of the reference patch.

9. The color prediction method according to claim 1, wherein the selecting of the similar color includes obtaining a color difference between the prediction target color and each sample color based on the spectral characteristics of the reference patch for the prediction target color and the spectral characteristics of the reference patch for a corresponding sample color, and selecting as the similar color a sample color from which the least color difference is obtained.

10. The color prediction method according to claim 1, wherein the obtaining of the rational equation includes obtaining as the relational equation an equation for calculating an approximate value of the spectral characteristics of the color prediction target patch from the spectral characteristics of the reference patch based on a plurality of pieces of combination data obtained for each unit wavelength range, each of the plurality of pieces of combination data being obtained by combining a spectral characteristic of the reference patch for the similar color and a spectral characteristic of the color prediction target patch for the similar color.

11. The color prediction method according to claim 10, wherein, the relational equation is an equation of the nth degree in which n is an integer of 2 or more.

12. The color prediction method according to claim 10, wherein, the relational equation is represented by using a power function.

13. The color prediction method according to claim 10, wherein the spectral characteristics are spectral reflectances, and when data of the spectral reflectances of the reference patch for the similar color does not include data having a value not less than p and not more than 1 with p being a predetermined value less than 1, the obtaining of the rational equation includes obtaining the relational equation by adding combination data in which a spectral reflectance of the reference patch for the similar color is 1 and a spectral reflectance of the color prediction target patch for the similar color is 1.

14. The color prediction method according to claim 1, wherein
the spectral characteristics are spectral reflectances, and when a maximum value of data of the spectral reflectances of the reference patch for the similar color is u which is not more than q that is a predetermined value less than 1, and a spectral reflectance of the color prediction target patch corresponding to the maximum value is v, the obtaining of the predicted values includes obtaining a predicted value of a spectral reflectance of the color prediction target patch corresponding to data having a value larger than u among data of the spectral reflectances of the reference patch for the prediction target color by performing linear interpolation based on the spectral reflectances of the reference patch for the prediction target color, using combination data in which a spectral reflectance of the reference patch for the similar color is u and a spectral reflectance of the color prediction target patch for the similar color is v, and combination data in which a spectral reflectance of the reference patch for the similar color is 1 and a spectral reflectance of the color prediction target patch for the similar color is 1.

15. The color prediction method according to claim 1, wherein the spectral characteristics includes spectral reflectances, the number of the spectral reflectances being obtained by dividing a wavelength range including a range from 400 nm to 700 nm by a unit wavelength range of an appropriate size.

16. The color prediction method according to claim 1, wherein the spectral characteristics are any one of spectral reflectances, spectral absorption factors, and spectral absorption coefficients.

17. A color prediction method for predicting spectral characteristics of each of a plurality of patches corresponding to ink densities of a plurality of levels when a color chart including the plurality of patches is made by applying an ink of a prediction target color on a base material with ink densities of the plurality of levels, the color prediction method comprising:
obtaining, for a plurality of sample colors for which spectral characteristics of the plurality of patches are obtained, a relational equation representing a relationship between spectral characteristics of a reference patch and spectral characteristics of a color prediction target patch that is a patch other than the reference patch, the reference patch being a patch having a maximum ink density from among the plurality of patches;
selecting, as a similar color, a color close to the prediction target color from among the plurality of sample colors; and
obtaining predicted values of spectral characteristics of the color prediction target patch for the prediction target color by applying spectral characteristics of the reference patch for the prediction target color to the relational equation for the sample color selected as the similar color.

18. A color prediction method for predicting spectral characteristics of each of a plurality of patches corresponding to ink densities of a plurality of levels when a color chart including the plurality of patches is made by applying an ink of a prediction target color on a base material with ink densities of the plurality of levels, the color prediction method comprising:
selecting, as a similar color, a color close to the prediction target color from among a plurality of sample colors for which spectral characteristics of the plurality of patches are obtained; and
obtaining predicted values of spectral characteristics of the color prediction target patch for the prediction target color by performing linear interpolation based on spectral characteristics of a reference patch for the prediction target color using a relationship between spectral characteristics of the reference patch for the similar color and spectral characteristics of a color prediction target patch that is a patch other than the reference patch for the similar color, the reference patch being a patch having a maximum ink density from among the plurality of patches.

* * * * *